(12) United States Patent
Bagheri et al.

(10) Patent No.: US 10,817,116 B2
(45) Date of Patent: Oct. 27, 2020

(54) DEVICE FOR PROCESSING SIGNALS FROM A PRESSURE-SENSING TOUCH PANEL

(71) Applicant: Cambridge Touch Technologies Ltd., Cambridge (GB)

(72) Inventors: Mojtaba Bagheri, Cambridge (GB); Babak Bastani, Royston (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 6 days.

(21) Appl. No.: 16/057,771

(22) Filed: Aug. 7, 2018

(65) Prior Publication Data

US 2019/0050080 A1 Feb. 14, 2019

(30) Foreign Application Priority Data

Aug. 8, 2017 (GB) .................................. 1712720.0

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 3/0416* (2013.01)

(58) Field of Classification Search
CPC ................................ G06F 3/044; G06F 3/0416

(Continued)

(56) References Cited

U.S. PATENT DOCUMENTS 4,516,112 A 5/1985 Chen
4,634,917 A 1/1987 Dvorsky et al.
(Continued)

FOREIGN PATENT DOCUMENTS

CN 204808295 U 11/2015
CN 105607790 A 5/2016
(Continued)

OTHER PUBLICATIONS

Notice of Allowance for U.S. Appl. No. 16/390,094, dated Sep. 17, 2019, 8 pages.
(Continued)

*Primary Examiner* — Mark Edwards

(57) ABSTRACT

A device (42) is provided for processing signals (10) from a projected capacitance touch panel (43), the touch panel (43) including a layer of piezoelectric material (9) disposed between a plurality of first electrodes (7, 27) and at least one second electrode (8). The device is configured, in response to receiving input signals (10) from a given first electrode (7, 27), to generate a pressure signal (15a, 15b) indicative of a pressure applied to the touch panel (43) proximate to the given first electrode (7, 27) and a capacitance signal (54a, 54b) indicative of a capacitance of the given first electrode (7, 27). The device (42) includes an amplifier (52) configured to generate an amplified signal (14a, 14b) based on the input signals (10). The device (42) also includes an analog-to-digital converter (50a, 50b) configured to be synchronised (53) with the capacitance signal (54a, 54b), and to generate the pressure signal (15a, 15b) by sampling the amplified signal (14a, 14b) at times corresponding to the amplitude of the capacitance signal (54a, 54b) being substantially equal to a ground, common mode or minimum value.

22 Claims, 19 Drawing Sheets

(58) Field of Classification Search
USPC .......................................................... 345/174
See application file for complete search history.

(56) References Cited

U.S. PATENT DOCUMENTS

| | | | |
|---|---|---|---|
| 4,899,710 A | 2/1990 | Takahashi et al. | |
| 4,962,328 A | 10/1990 | Woss et al. | |
| 5,374,787 A | 12/1994 | Miller et al. | |
| 5,563,587 A | 10/1996 | Harjani | |
| 5,736,980 A | 4/1998 | Iguchi et al. | |
| 5,942,733 A | 8/1999 | Allen | |
| 6,376,966 B1 | 4/2002 | Gallmeyer et al. | |
| 7,042,288 B2 | 5/2006 | Matsui et al. | |
| 7,152,482 B2 | 12/2006 | Ueno et al. | |
| 7,538,760 B2 | 5/2009 | Hotelling | |
| 8,482,530 B2 | 7/2013 | Bollinger | |
| 8,854,064 B2 | 10/2014 | Aras et al. | |
| 8,982,081 B2 | 3/2015 | Li et al. | |
| 8,988,384 B2 | 3/2015 | Krah et al. | |
| 9,348,473 B2 | 5/2016 | Ando | |
| 9,360,967 B2 | 6/2016 | Hotelling | |
| 9,383,884 B2 | 7/2016 | Ando | |
| 9,417,725 B1 | 8/2016 | Watazu et al. | |
| 9,575,608 B2 | 2/2017 | Ando | |
| 9,612,690 B2 | 4/2017 | Zirki et al. | |
| 9,627,605 B2 | 4/2017 | Ando et al. | |
| 9,690,408 B1 * | 6/2017 | Krah | G06F 3/0412 |
| 9,698,776 B2 | 7/2017 | Toda | |
| 9,785,301 B2 | 10/2017 | Watazu | |
| 9,904,382 B2 | 2/2018 | Ando et al. | |
| 10,126,807 B2 | 11/2018 | Nathan et al. | |
| 10,254,894 B2 | 4/2019 | Nathan et al. | |
| 10,282,046 B2 | 5/2019 | Nathan et al. | |
| 10,310,659 B2 | 6/2019 | Nathan et al. | |
| 10,318,038 B2 | 6/2019 | Nathan et al. | |
| 10,430,009 B2 | 10/2019 | Nathan et al. | |
| 2002/0033920 A1 | 3/2002 | Sun et al. | |
| 2003/0234769 A1 | 12/2003 | Cross et al. | |
| 2004/0155991 A1 | 8/2004 | Lowles et al. | |
| 2005/0024344 A1 | 2/2005 | Trachte | |
| 2006/0017710 A1 | 1/2006 | Lee et al. | |
| 2006/0028095 A1 | 2/2006 | Maruyama et al. | |
| 2006/0138983 A1 | 6/2006 | Lee | |
| 2007/0024596 A1 | 2/2007 | Takahashi et al. | |
| 2007/0040814 A1 | 2/2007 | Lee | |
| 2007/0119698 A1 | 5/2007 | Day | |
| 2007/0163815 A1 | 7/2007 | Ungareth | |
| 2007/0236466 A1 | 10/2007 | Hotelling | |
| 2007/0262964 A1 | 11/2007 | Zotov | |
| 2008/0007532 A1 | 1/2008 | Chen | |
| 2008/0018608 A1 | 1/2008 | Serban et al. | |
| 2008/0048995 A1 | 2/2008 | Abileah | |
| 2008/0165158 A1 | 7/2008 | Hotelling et al. | |
| 2008/0174852 A1 | 7/2008 | Hirai et al. | |
| 2008/0176042 A1 | 7/2008 | Sugawara et al. | |
| 2009/0027350 A1 | 1/2009 | Lee et al. | |
| 2009/0027353 A1 | 1/2009 | Im et al. | |
| 2009/0061823 A1 | 3/2009 | Se | |
| 2009/0065267 A1 | 3/2009 | Sato | |
| 2009/0066663 A1 | 3/2009 | Chang | |
| 2009/0066673 A1 | 3/2009 | Molne et al. | |
| 2009/0146533 A1 | 6/2009 | Leskinen et al. | |
| 2009/0160822 A1 | 6/2009 | Eguchi et al. | |
| 2009/0237374 A1 | 9/2009 | Li et al. | |
| 2009/0254869 A1 | 10/2009 | Ludwig et al. | |
| 2009/0309616 A1 | 12/2009 | Klinghult et al. | |
| 2009/0321240 A1 | 12/2009 | Huang et al. | |
| 2010/0013800 A1 | 1/2010 | Elias | |
| 2010/0051354 A1 | 3/2010 | Ningrat et al. | |
| 2010/0052880 A1 | 3/2010 | Laitinen et al. | |
| 2010/0053087 A1 | 3/2010 | Dai et al. | |
| 2010/0066692 A1 | 3/2010 | Noguchi | |
| 2010/0079384 A1 | 4/2010 | Grivna et al. | |
| 2010/0109595 A1 | 5/2010 | Tan et al. | |
| 2010/0110026 A1 | 5/2010 | Kis | |
| 2010/0110028 A1 | 5/2010 | Takahashi et al. |
| 2010/0123671 A1 | 5/2010 | Lee |
| 2010/0128002 A1 | 5/2010 | Stacy et al. |
| 2010/0134439 A1 | 6/2010 | Ito et al. |
| 2010/0144391 A1 | 6/2010 | Chang |
| 2010/0149128 A1 | 6/2010 | No et al. |
| 2010/0201635 A1 | 8/2010 | Klinghult et al. |
| 2010/0231530 A1 | 9/2010 | Lin et al. |
| 2010/0253638 A1 | 10/2010 | Yousefpor |
| 2010/0253645 A1 | 10/2010 | Bolender et al. |
| 2010/0265197 A1 | 10/2010 | Purdy et al. |
| 2010/0265212 A1 | 10/2010 | Sekiguchi et al. |
| 2010/0309164 A1 | 12/2010 | Yeh et al. |
| 2011/0001492 A1 | 1/2011 | Nys |
| 2011/0007020 A1 | 1/2011 | Hong et al. |
| 2011/0037624 A1 | 2/2011 | Pance et al. |
| 2011/0096025 A1 | 4/2011 | Slobodin |
| 2011/0141052 A1 | 6/2011 | Bernstein et al. |
| 2011/0157068 A1 | 6/2011 | Parker et al. |
| 2011/0157087 A1 | 6/2011 | Kanehira et al. |
| 2011/0175844 A1 | 7/2011 | Berggren |
| 2011/0187674 A1 | 8/2011 | Baker et al. |
| 2011/0227836 A1 | 9/2011 | Li et al. |
| 2011/0234508 A1 | 9/2011 | Oda et al. |
| 2011/0260990 A1 | 10/2011 | Ali et al. |
| 2011/0261007 A1 | 10/2011 | Joharapurkar |
| 2011/0267300 A1 | 11/2011 | Serban et al. |
| 2011/0273396 A1 | 11/2011 | Chung et al. |
| 2011/0278078 A1 | 11/2011 | Schediwy et al. |
| 2011/0291994 A1 | 12/2011 | Kwak |
| 2012/0013572 A1 | 1/2012 | Pak et al. |
| 2012/0013573 A1 | 1/2012 | Liu et al. |
| 2012/0038583 A1 | 2/2012 | Westhues et al. |
| 2012/0057803 A1 | 3/2012 | Wakazono |
| 2012/0062508 A1 | 3/2012 | Liu et al. |
| 2012/0075226 A1 | 3/2012 | Andoh |
| 2012/0081332 A1 | 4/2012 | Atsuta et al. |
| 2012/0086668 A1 | 4/2012 | Wang et al. |
| 2012/0105367 A1 | 5/2012 | Son |
| 2012/0121142 A1 | 5/2012 | Nageesh |
| 2012/0154326 A1 | 6/2012 | Liu |
| 2012/0188202 A1 | 7/2012 | Tsujino et al. |
| 2012/0206401 A1 | 8/2012 | Lin et al. |
| 2012/0242610 A1 | 9/2012 | Yatsumatsu |
| 2012/0242619 A1 | 9/2012 | Barbosa et al. |
| 2012/0268416 A1 | 10/2012 | Pirogov et al. |
| 2012/0274599 A1 | 11/2012 | Schediwy |
| 2012/0293551 A1 | 11/2012 | Momeyer |
| 2012/0299866 A1 | 11/2012 | Pao et al. |
| 2012/0299868 A1 | 11/2012 | Bhagavat |
| 2013/0009653 A1 | 1/2013 | Fukushima |
| 2013/0009905 A1 | 1/2013 | Castillo |
| 2013/0018489 A1 | 1/2013 | Grunthaner et al. |
| 2013/0021285 A1 | 1/2013 | Kimura |
| 2013/0027339 A1 | 1/2013 | Kodani et al. |
| 2013/0027340 A1 | 1/2013 | Kodani et al. |
| 2013/0033451 A1 | 2/2013 | Olsen |
| 2013/0050126 A1 | 2/2013 | Kimura et al. |
| 2013/0050130 A1 | 2/2013 | Brown |
| 2013/0050138 A1 | 2/2013 | Chan et al. |
| 2013/0076646 A1 | 3/2013 | Krah et al. |
| 2013/0076647 A1 | 3/2013 | Yousefpor |
| 2013/0082970 A1 | 4/2013 | Frey |
| 2013/0113752 A1 | 5/2013 | Chang et al. |
| 2013/0127776 A1 | 5/2013 | Guard et al. |
| 2013/0135244 A1 | 5/2013 | Lynch et al. |
| 2013/0147739 A1 | 6/2013 | Aberg et al. |
| 2013/0162587 A1 | 6/2013 | Chan et al. |
| 2013/0167663 A1 | 7/2013 | Eventoff |
| 2013/0176265 A1 | 7/2013 | Zurek et al. |
| 2013/0176274 A1 | 7/2013 | Sobel et al. |
| 2013/0176275 A1 | 7/2013 | Weaver et al. |
| 2013/0194198 A1 | 8/2013 | Guard |
| 2013/0229382 A1 | 9/2013 | Huang |
| 2013/0234986 A1 | 9/2013 | Elias |
| 2013/0234987 A1 | 9/2013 | Ye et al. |
| 2013/0257744 A1 | 10/2013 | Daghigh et al. |
| 2013/0257759 A1 | 10/2013 | Daghigh |
| 2013/0257769 A1 | 10/2013 | Sheik-Nainar |

(56) References Cited

U.S. PATENT DOCUMENTS

| | | |
|---|---|---|
| 2013/0257799 A1 | 10/2013 | Lamont et al. |
| 2013/0265239 A1 | 10/2013 | Parekh |
| 2013/0265256 A1 | 10/2013 | Nathan |
| 2013/0265276 A1 | 10/2013 | Obeidat et al. |
| 2013/0278542 A1 | 10/2013 | Stephanou et al. |
| 2013/0278544 A1 | 10/2013 | Cok |
| 2013/0285970 A1 | 10/2013 | Ahn et al. |
| 2013/0300695 A1 | 11/2013 | Cho et al. |
| 2013/0307823 A1 | 11/2013 | Grivna |
| 2014/0002114 A1 | 1/2014 | Schwartz et al. |
| 2014/0008203 A1 | 1/2014 | Nathan et al. |
| 2014/0009433 A1 | 1/2014 | Chen et al. |
| 2014/0009434 A1 | 1/2014 | Hiroyuki |
| 2014/0013865 A1 | 1/2014 | White et al. |
| 2014/0022211 A1 | 1/2014 | Karpin et al. |
| 2014/0028611 A1 | 1/2014 | Chen |
| 2014/0043287 A1 | 2/2014 | Nakajima et al. |
| 2014/0043289 A1 | 2/2014 | Stern |
| 2014/0049892 A1 | 2/2014 | Huang et al. |
| 2014/0062933 A1 | 3/2014 | Coulson et al. |
| 2014/0062934 A1 | 3/2014 | Coulson et al. |
| 2014/0071077 A1 | 3/2014 | Kang |
| 2014/0078096 A1 | 3/2014 | Tan et al. |
| 2014/0078101 A1 | 3/2014 | Katsurahira |
| 2014/0085213 A1 | 3/2014 | Huppi et al. |
| 2014/0085247 A1 | 3/2014 | Leung et al. |
| 2014/0085551 A1 | 3/2014 | Koo |
| 2014/0098058 A1 | 4/2014 | Baharav et al. |
| 2014/0139444 A1 | 5/2014 | Kauhanen et al. |
| 2014/0028606 A1 | 6/2014 | Giannetta |
| 2014/0176493 A1 | 6/2014 | Ahn et al. |
| 2014/0210781 A1 | 7/2014 | Stern |
| 2014/0216174 A1 | 8/2014 | Aberg et al. |
| 2014/0218334 A1 | 8/2014 | Shibata et al. |
| 2014/0240621 A1 | 8/2014 | Klinghult et al. |
| 2014/0247231 A1 | 9/2014 | Lin |
| 2014/0267128 A1 | 9/2014 | Bulea et al. |
| 2014/0267134 A1 | 9/2014 | Bulea et al. |
| 2014/0285456 A1 | 9/2014 | Zhang |
| 2014/0292699 A1 | 10/2014 | Ando |
| 2014/0307186 A1 | 10/2014 | Yun et al. |
| 2014/0333577 A1 | 11/2014 | Ahn |
| 2014/0341446 A1 | 11/2014 | Hare et al. |
| 2014/0347315 A1 | 11/2014 | Mo et al. |
| 2014/0354584 A1 | 12/2014 | Cok et al. |
| 2014/0354585 A1 | 12/2014 | Cok et al. |
| 2014/0360854 A1 | 12/2014 | Roziere et al. |
| 2014/0362000 A1 | 12/2014 | Seo |
| 2014/0368260 A1 | 12/2014 | Tanada |
| 2014/0375580 A1 | 12/2014 | Peshkin et al. |
| 2015/0002452 A1 | 1/2015 | Klinghult |
| 2015/0022491 A1 | 1/2015 | Dumitru et al. |
| 2015/0084909 A1 | 3/2015 | Worfolk et al. |
| 2015/0103042 A1 | 4/2015 | Lee et al. |
| 2015/0130770 A1 | 5/2015 | Takatori |
| 2015/0168466 A1 | 6/2015 | Park et al. |
| 2015/0185955 A1 | 7/2015 | Ando |
| 2015/0193056 A1 | 7/2015 | Bolander |
| 2015/0199061 A1 | 7/2015 | Kitada et al. |
| 2015/0234446 A1 | 8/2015 | Nathan et al. |
| 2015/0242050 A1 | 8/2015 | Huang et al. |
| 2015/0253935 A1 | 9/2015 | Toda |
| 2015/0261344 A1 | 9/2015 | Wigdor et al. |
| 2015/0324052 A1 | 11/2015 | Lee et al. |
| 2015/0331517 A1 | 11/2015 | Filiz |
| 2015/0338981 A1 | 11/2015 | Ando et al. |
| 2015/0355771 A1 | 12/2015 | Watazu et al. |
| 2015/0378491 A1 | 12/2015 | Worfolk et al. |
| 2016/0011666 A1 | 1/2016 | Evreinov et al. |
| 2016/0026299 A1 | 1/2016 | Kitada et al. |
| 2016/0034088 A1 | 2/2016 | Richards et al. |
| 2016/0034089 A1 | 2/2016 | Kano et al. |
| 2016/0041648 A1 | 2/2016 | Richards |
| 2016/0062497 A1 | 3/2016 | Huppi et al. |
| 2016/0062498 A1 | 3/2016 | Huppi et al. |
| 2016/0098131 A1* | 4/2016 | Ogata .................. G06F 1/1643 345/173 |
| 2016/0117034 A1 | 4/2016 | Day |
| 2016/0117035 A1 | 4/2016 | Watazu et al. |
| 2016/0124544 A1 | 5/2016 | Kang et al. |
| 2016/0179276 A1 | 6/2016 | Nathan et al. |
| 2016/0195994 A1 | 7/2016 | Kitada et al. |
| 2016/0259465 A1 | 9/2016 | Agarwal et al. |
| 2016/0274712 A1 | 9/2016 | Liu |
| 2016/0282999 A1 | 9/2016 | Hwang et al. |
| 2016/0291729 A1 | 10/2016 | Schardt et al. |
| 2016/0299625 A1 | 10/2016 | Kano |
| 2016/0306481 A1 | 10/2016 | Filiz et al. |
| 2016/0320899 A1 | 11/2016 | Watazu et al. |
| 2017/0045989 A1 | 2/2017 | Lee et al. |
| 2017/0068383 A1 | 3/2017 | Chern et al. |
| 2017/0108973 A1 | 4/2017 | Kim et al. |
| 2017/0199624 A1 | 7/2017 | Nathan et al. |
| 2017/0262099 A1 | 9/2017 | Nathan et al. |
| 2017/0359064 A1 | 12/2017 | Nathan et al. |
| 2017/0364193 A9 | 12/2017 | Nathan et al. |
| 2017/0371470 A1 | 12/2017 | Nathan et al. |
| 2018/0045586 A1 | 2/2018 | Kawamura et al. |
| 2018/0143725 A1 | 5/2018 | Nahan et al. |
| 2018/0143728 A1 | 5/2018 | Withers et al. |
| 2019/0227649 A1 | 7/2019 | Micci et al. |
| 2019/0243502 A1 | 8/2019 | Nathan et al. |
| 2019/0243503 A1 | 8/2019 | Nathan et al. |
| 2019/0253053 A1 | 8/2019 | Nathan et al. |
| 2019/0286263 A1 | 9/2019 | Nathan et al. |
| 2019/0361547 A1 | 11/2019 | Nathan et al. |

FOREIGN PATENT DOCUMENTS

| | | |
|---|---|---|
| CN | 105739790 A | 7/2016 |
| CN | 105930019 A | 9/2016 |
| CN | 105975121 A | 9/2016 |
| CN | 106527822 A | 3/2017 |
| EP | 0574213 A1 | 12/1993 |
| EP | 902886 A1 | 10/1997 |
| EP | 2112576 A1 | 10/2009 |
| EP | 2290510 A1 | 3/2011 |
| EP | 2693316 A1 | 2/2014 |
| EP | 2871554 A1 | 5/2015 |
| EP | 2884373 A1 | 6/2015 |
| EP | 2899615 A1 | 7/2015 |
| EP | 2902886 A1 | 8/2015 |
| GB | 1258176 | 12/1971 |
| GB | 2120797 A | 12/1983 |
| GB | 2138567 A1 | 10/1984 |
| GB | 2533667 A | 6/2016 |
| GB | 2544353 A1 | 5/2017 |
| JP | 1993-0561966 A | 3/1993 |
| JP | H8-44493 A | 2/1996 |
| JP | 3003311 B2 | 1/2000 |
| JP | 2013-513865 A | 4/2013 |
| JP | 2013131110 A | 7/2013 |
| JP | 2014-202618 A | 10/2014 |
| JP | 2014209297 A | 11/2014 |
| JP | 2014-238267 A | 12/2014 |
| JP | 2015097068 A | 5/2015 |
| WO | 2006135483 A2 | 12/2006 |
| WO | 2007146785 A1 | 12/2007 |
| WO | 2008065205 A1 | 6/2008 |
| WO | 2009150498 A2 | 12/2009 |
| WO | 2010038466 A1 | 4/2010 |
| WO | 2011055809 A1 | 5/2011 |
| WO | 2011/156447 A1 | 12/2011 |
| WO | 2012/034714 A1 | 3/2012 |
| WO | 2012/034715 A1 | 3/2012 |
| WO | 2012031564 A1 | 3/2012 |
| WO | 2013/029642 A1 | 3/2013 |
| WO | 2013/149024 A1 | 10/2013 |
| WO | 2014/045847 A1 | 3/2014 |
| WO | 2014/098946 A1 | 6/2014 |
| WO | 2014092758 A1 | 6/2014 |
| WO | 2014094283 A1 | 6/2014 |
| WO | 2014/129083 A1 | 8/2014 |
| WO | 2014/192786 A1 | 12/2014 |

(56) References Cited

FOREIGN PATENT DOCUMENTS

| WO | 2014/196367 A | 12/2014 | |
|---|---|---|---|
| WO | 2014196360 A1 | 12/2014 | |
| WO | 2015046289 A1 | 4/2015 | |
| WO | 2015/077200 A1 | 5/2015 | |
| WO | 2015/098725 A1 | 7/2015 | |
| WO | 2015/106183 A1 | 7/2015 | |
| WO | 2016102975 A2 | 6/2016 | |
| WO | WO-2016102975 A2 * | 6/2016 | ........... G06F 3/0414 |
| WO | 2016199626 A1 | 12/2016 | |
| WO | 2017109455 A1 | 6/2017 | |
| WO | 2017122466 A1 | 7/2017 | |

OTHER PUBLICATIONS

U.S. Final Office Action for U.S. Appl. No. 15/669,941, dated Dec. 21, 2018, 17 pages.
U.S. Non Final Office Action for U.S. Appl. No. 15/669,941, dated Aug. 16, 2018, 20 pages.
U.S. Non Final Office Action for U.S. Appl. No. 16/390,094, dated May 17, 2019, 12 pages.
U.S. Final Office Action for U.S. Appl. No. 15/669,941, dated Mar. 12, 2018, 18 pages.
U.S. Non Final Office Action for U.S. Appl. No. 15/669,941, dated Nov. 17, 2017, 12 pages.
U.S. Advisory Opinion for U.S. Appl. No. 13/935,392, dated Jan. 10, 2017, 3 pages.
U.S. Final Office Action for U.S. Appl. No. 13/935,392, dated Jul. 18, 2017, 34 pages.
U.S. Final Office Action for U.S. Appl. No. 13/935,392, dated Aug. 2, 2016, 30 pages.
U.S. Final Office Action for U.S. Appl. No. 13/935,392, dated Nov. 3, 2015, 30 pages.
U.S. Non Final Office Action for U.S. Appl. No. 13/935,392, dated Jan. 5, 2018, 36 pages.
U.S. Non Final Office Action for U.S. Appl. No. 13/935,392, dated Feb. 27, 2017, 34 pages.
U.S. Non Final Office Action for U.S. Appl. No. 13/935,392, dated Mar. 16, 2016, 28 pages.
U.S. Non Final Office Action for U.S. Appl. No. 13/935,392, dated Mar. 20, 2015, 23 pages.
U.S. Non Final Office Action for U.S. Appl. No. 16/385,213, dated Jun. 14, 2019, 20 pages.
U.S. Non Final Office Action for U.S. Appl. No. 16/385,237, dated Jun. 19, 2019, 22 pages.
U.S. Non Final Office Action for U.S. Appl. No. 15/539,038, dated Jul. 18, 2018, 27 pages.
U.S. Non Final Office Action for U.S. Appl. No. 14/978,531, dated Jun. 20, 2018, 22 pages.
U.S. Final Office Action for U.S. Appl. No. 13/935,392, dated May 4, 2018, 27 pages.
Nathan et. al., Commonly assigned U.S. Appl. No. 16/534,076, filed Aug. 7, 2019, 93 pages.
Notice of Allowance for U.S. Appl. No. 15/386,612, dated Mar. 7, 2019, 3 pages.
Notice of Allowance for U.S. Appl. No. 15/596,156, dated Jun. 29, 2018, 10 pages.
Notice of Allowance for U.S. Appl. No. 14/978,531, dated Jan. 22, 2019, 9 pages.
Notice of Allowance for U.S. Appl. No. 15/539,038, dated Jan. 24, 2019, 8 pages.
Notice of Allowance for U.S. Appl. No. 16/356,538, dated May, 15, 2019, 9 pages.
Notice of Allowance for U.S. Appl. No. 15/596,156, dated Feb. 5, 2019, 5 pages.
Combined Search and Examination Report under Sections 17 and 18(3) for UK application No. GB1712720.0, dated Feb. 7, 2017, 5 pages.
Examination Report in United Kingdom application GB1712720.0, dated Oct. 28, 2019, 3 pages.
Nathan et. al, Commonly assigned U.S. Appl. No. 16/390,094, filed Apr. 22, 2019, 67 pages.
Nathan et. al, Commonly assigned U.S. Appl. No. 16/385,213, filed Apr. 16, 2019, 115 pages.
Nathan et. al, Commonly assigned U.S. Appl. No. 16/385,237, filed Apr. 16, 2019, 115 pages.
Mojtaba, el al. Commonly assigned U.S. Appl. No. 16/430,009, filed Jun. 3, 2019, 84 pages.
International Search Report and Written Opinion, dated Sep. 25, 2018, in related International Application No. PCT /GB2018/ 052183, 15 pages.
U.S. Non Final Office Action, U.S. Appl. No. 16/534,076, USPTO, dated Dec. 10, 2019, 7 pages.
U.S. Final Office Action, U.S. Appl. No. 16/385,213, USPTO, dated Jan. 7, 2020, 23 pages.
Notice of Allowance in U.S. Appl. No. 16/534,076, USPTO, dated Mar. 27, 2020, 9 pages.
Non-final office action relating to U.S. Appl. No. 16/390,094, USPTO, dated Jan. 28, 2020, 12 pages.
U.S. Final Office Action, U.S. Appl. No. 16/390,094, dated Jul. 31, 2020, 9 pages.
Nathan et. al. U.S. Appl. No. 16/891,285, entitled "Pressure-sensitive Touch Panel", filed Jun. 3, 2020, 93 pages.
Bagheri, U.S. Appl. No. 16/636,668, entitled "Touch Panel Pressure Detection" filed Feb. 5, 2020, 79 pages.

* cited by examiner

DEVICE FOR PROCESSING SIGNALS FROM A PRESSURE-SENSING TOUCH PANEL

RELATED APPLICATIONS

This application is based upon and claims the benefit of priority from United Kingdom patent application 1712720.0, filed on Aug. 8, 2017, the entire contents of which are hereby incorporated by reference in its entirety.

FIELD OF THE INVENTION

The present invention relates to a device for processing signals from a pressure-sensing projected capacitance touch panel, and to a touch panel system including the device.

BACKGROUND

Resistive and capacitive touch panels are used as input devices for computers and mobile devices. One type of capacitive touch panel, projected capacitance touch panels, is often used for mobile devices. An example of a projected capacitance touch and is described in US 2010/0079384 A1.

Projected capacitance touch panels operate by detecting changes in electric fields caused by the proximity of a conductive object. The location at which a projected capacitance touch panel is touched is often determined using an array or grid of capacitive sensors. Although projected capacitance touch panels can usually differentiate between single-touch events and multi-touch events, they suffer the drawback of not being able to sense pressure. Thus, projected capacitance touch panels tend to be unable to distinguish between a relatively light tap and a relatively heavy press. A touch panel which can sense pressure can allow a user to interact with a device in new ways by providing additional information about user interaction(s) with the touch panel.

Different approaches have been proposed to allow a touch panel to sense pressure. One approach is to provide capacitive sensors which include a gap whose size can be reduced by applied pressure, so as to produce a measureable difference in the mutual capacitance. For example, US 2014/0043289 A describes a pressure sensitive capacitive sensor for a digitizer system which includes an interaction surface, at least one sensing layer operable to sense interaction by mutual capacitive sensing, and an additional layer comprising resilient properties and operable to be locally compressed responsive to pressure locally applied during user interaction with the capacitive sensor. However, the need for a measureable displacement may make it more difficult to use an exterior glass surface, and may cause problems with material fatigue after repeated straining.

Other pressure sensitive touch panels have proposed using one or more discrete force sensors supporting a capacitive touch panel, such that pressure applied to the capacitive touch panel is transferred to one or more sensors located behind the panel or disposed around the periphery. For example, US 2013/0076646 A1 describes using strain gauges with a force sensor interface which can couple to touch circuitry. WO 2012/031564 A1 describes a touch panel including a first panel, a second panel, and a displacement sensor sandwiched between the first panel and the second panel. The displacement sensors, such as capacitive or piezoresistive sensors, are placed around the edge of the second paid. However, it may be difficult to distinguish the pressure of multiple touches using sensors located behind a touch panel or disposed around the periphery.

Other pressure sensitive touch panels have been proposed which attempt to combine capacitive touch sensing with force sensitive piezoelectric layers. For example, WO 2009/15498 A2 describes a device including a first layer, a second layer, a third layer, a capacitive sensing component coupled to the first layer, and a force sensing component coupled to the first layer and the third layer and configured to detect the amount of force applied to the second layer. WO 2015/046289 A1 describes a touch panel formed by stacking a piezoelectric sensor and an electrostatic sensor. The piezoelectric sensor is connected to a pressing force detection signal generation unit, and the electrostatic sensor is connected to a contact detection signal generation unit. However, systems which use separate electronics to sense changes in capacitance and pressures may make a touch panel more bulky and expensive. Systems in which electrodes are directly applied or patterned onto a piezoelectric film can be more complex and expensive to produce.

WO 2016/102975 A2 describes apparatus and methods for combined capacitance and pressure sensing in which a single signal is amplified then subsequently separated into pressure and capacitance components. GB 2544353 A describes apparatus and methods for combined capacitance and pressure sensing in which a single signal is separated into a capacitance signal, and a pressure signal which is amplified.

SUMMARY

According to a first aspect of the invention there is provided a desire for processing signals from a projected capacitance touch panel, the touch panel including a layer of piezoelectric material disposed between a plurality of first electrodes and at least one second electrode. The device is configured, in response to receiving input signals from a given first electrode, to generate a pressure signal indicative of a pressure applied to the touch panel proximate to the given first electrode and a capacitance signal indicative of a capacitance of the given first electrode. The device includes an amplifier configured to generate an amplified signal based on the input signals. The device also includes an analog-to-digital converter configured to be synchronised with the capacitance signal, and to generate the pressure signal by sampling the amplified signal at times corresponding to the amplitude of the capacitance signal being substantially equal to a ground, common mode or minimum value.

The times for sampling the amplified signal may correspond to the capacitance signal being within ±100 μv, within ±1 mV, within ±2 mV, within ±5 mV, within ±10 mV, within ±20 mV, within ±50 mV or within ±100 mV of a ground, common mode or minimum value of the capacitance signal.

The device may be configured to drive an electrode of the touch panel using a capacitance measurement signal, such that the input signals received from a given first electrode vary in dependence upon a capacitive coupling between the given first electrode and the capacitance measurement signal, and in dependence upon a strain of the layer of piezoelectric material proximate to the given first electrode.

The capacitance measurement signal may be for measuring a self-capacitance of a given first electrode. The capacitance measurement signal may be for measuring a mutual capacitance between the given first electrode and another electrode.

The device may be configured to generate a synchronisation signal in dependence upon the capacitance measurement signal. The analog-to-digital converter may be configured to sample the amplified signal in dependence upon the synchronisation signal.

The device may be configured to generate the synchronisation signal including an offset with respect to the capacitance measurement signal. The offset may be determined in dependence upon a phase difference between the capacitance measurement signal and the input signals received from the first electrode.

The device may also include a second analog-to-digital convertor configured to generate a digitised amplified signal by sampling the amplified signal. The device may also include a controller configured to generate the capacitance signal based on the digitised amplified signal.

The analog-to-digital converter may be configured to generate the pressure signal and a digitised amplified signal sequentially. The analog-to-digital converter may be configured to generate the pressure signal by sampling the amplified signal at a first sampling frequency, $f_{piezo}$. The analog-to-digital converter may be configured to generate the capacitance signal by sampling the amplified signal at a second sampling frequency, $f_{cap}$, which is greater than the first sampling frequency. The device may also include a controller configured to generate the capacitance signal based on the digitised amplified signal.

The controller may be configured to generate the capacitance signal by applying a high pass filter to the digitised amplified signal. The controller may be configured to generate the capacitance signal based on one or more recently obtained values of the pressure signal.

The device may also include a capacitive touch controller. The device may also include a signal separation stage configured to couple the input signals to the amplifier, and to couple the input signals to the capacitive touch controller via a high-pass filter.

The high pass filter may include a capacitance. The high-pass filter may be a capacitance.

The device may include a plurality of amplifiers. Each amplifier may be configured for coupling to a first electrode of the touch panel. The device may also include a multiplexer having an input coupled to the output of each amplifier, and an output coupled to an input of the analog-to-digital converter.

The device may also include a multiplexer having a plurality of inputs, each input for coupling to a first electrode of, the touch panel, and an output coupled to an input of the amplifier.

Apparatus may include the device and a touch panel including a layer of piezoelectric material disposed between a plurality of first electrodes and at least one second electrode.

A portable telecommunications device may include the device or the apparatus.

According to a second aspect of the invention there is provided a method of processing signals from a projected capacitance touch panel, the touch panel comprising a layer of piezoelectric material disposed between a plurality of first electrodes and at least one second electrode. The method includes, in response to receiving input signals from a given first electrode, generating a capacitance signal indicative of a capacitance of the given first electrode. The method also includes, in response to receiving input signals from a given first electrode, generating an amplified signal based on the input signal. The method also includes, in response to receiving input signals from a given first electrode, generating, using an analog-to-digital converter synchronised with the capacitance signal, a pressure signal indicative of a pressure applied to the touch panel proximate to the given first electrode. The pressure signal is generated by sampling the amplified signal at times corresponding to the amplitude of the capacitance signal being substantially equal to a ground, common mode or minimum value.

The times for sampling the amplified signal may correspond to the capacitance signal being within ±100 µv, within ±1 mV, within ±2 mV, within ±5 mV, within ±10 mV, within ±20 mV, within ±50 mV or within ±100 mV of a ground, common mode or minimum value of the capacitance signal.

The method may also include driving an electrode of the touch panel using a capacitance measurement signal, such that the input signals received from a given first electrode vary in dependence upon a capacitive coupling between the given first electrode and the capacitance measurement signal, and in dependence upon a strain of the layer of piezoelectric material proximate to the given first electrode.

The capacitance measurement signal may be for measuring a self-capacitance of a given first electrode. The capacitance measurement signal may be for measuring a mutual capacitance between the given first electrode and another electrode.

The method may also include generating a synchronisation signal in dependence upon the capacitance measurement signal. The method may also include controlling the analog-to-digital converter to sample the amplified signal in dependence upon the synchronisation signal.

The synchronisation signal may be generated including an offset with respect to the capacitance measurement signal. The offset may be determined in dependence upon a phase difference between the capacitance measurement signal and the input signals received from the first electrode.

Generating the capacitance signal may include generating, using a second analog-to-digital convertor, a digitised amplified signal by sampling the amplified signal. Generating the capacitance signal may include generating, using a controller, the capacitance signal based on the digitised amplified signal.

The method may also include sequentially generating the pressure signal and a digitised amplified signal. The pressure signal may be generated by using the analog-to-digital converter to sample the amplified signal at a first sampling frequency $f_{piezo}$. The amplified signal may be generated by using the analog-to-digital converter to sample the amplified signal at a second sampling frequency, $f_{cap}$, which is greater than the first sampling frequency. The method may also include generating, using a controller, the capacitance signal based on the digitised amplified signal.

The controller may be configured to generate the capacitance signal by applying a high pass filter to the digitised amplified signal.

BRIEF DESCRIPTION OF THE DRAWINGS

Certain embodiments of the present invention will now be described, by way of example, with reference to the accompanying drawings in which.

DETAILED DESCRIPTION

Figure 1:
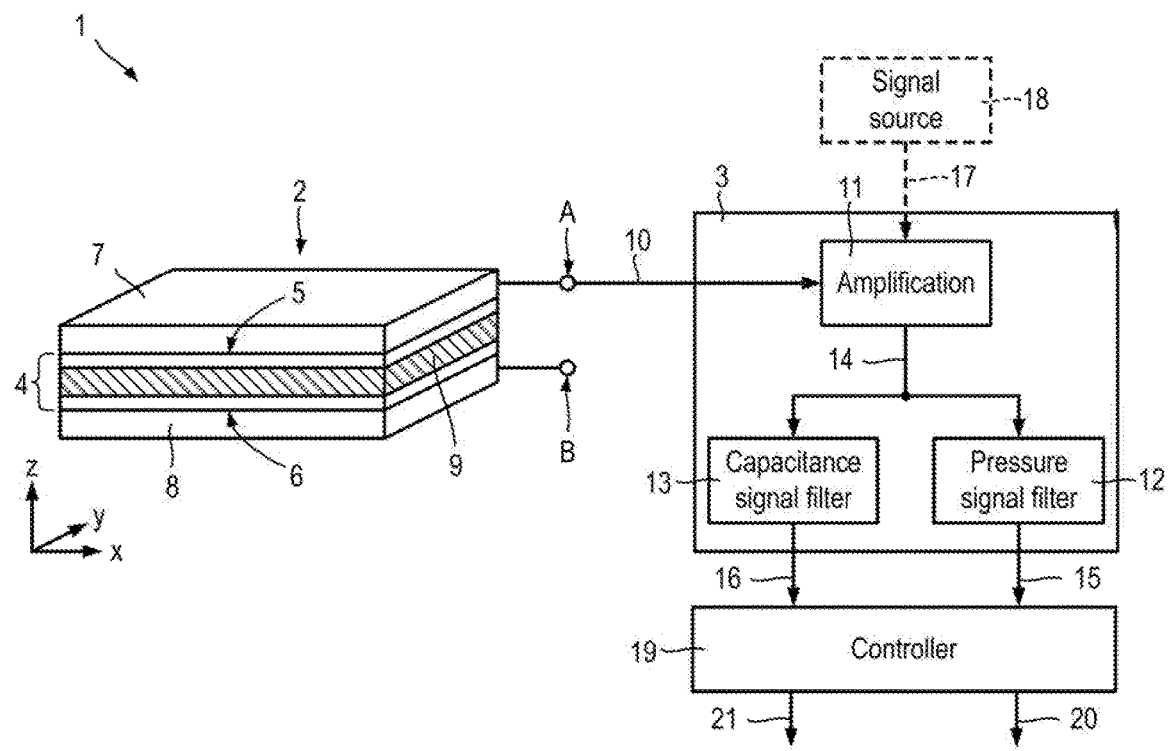
FIG. 1 illustrates a first apparatus for combined capacitive and pressure sensing.

In the following description, like parts are denoted by like reference numerals.

First combined capacitance and pressure sensing apparatus and first touch sensor: FIG. 1 schematically illustrates a first apparatus 1 for combined capacitive and pressure sensing which includes a first touch sensor 2, a front end module 3 and a controller 19.

The first touch sensor 2 includes a layer structure 4 having a first face 5 and a second, opposite, face 6, a first electrode 7 and a second electrode 8. The layer structure 4 includes one or more layers, including at least a layer of piezoelectric material 9. Each layer included in the layer structure 4 is generally planar and extends in first X and second v directions which are perpendicular to a thickness direction z. The one or more layers of the layer structure 4 are arranged between the first and second faces 5, 6 such that the thickness direction of each layer of the layer structure 4 is perpendicular to the first and second faces 5, 6. The first electrode 7 is disposed on the first face 5 of the layer structure 4 and the second electrode 8 is disposed on the second face 6 of the layer structure 4 The first electrode 7 is electrical coupled to a terminal A and the second electrode 8 is coupled to a terminal B.

Preferably, the layer of piezoelectric material 9 is a piezoelectric polymer such as polyvinylidene fluoride (PVDF) or polylactic acid. However, the piezoelectric material may alternatively be a layer of a piezoelectric ceramic such as lead zirconate titanate (PZT). Preferably, the first and second electrodes 7, 8 are indium tin oxide (ITO) or indium zinc oxide (IZO). However, the first, and second electrodes 7, 8 may be metal films such as aluminium, copper, silver or other metals suitable for deposition and patterning as a thin film. The first and second electrodes 7, 8 may be conductive polymers such as polyaniline, polythiphene, polypyrrole or poly(3,4-ethylenedioxythiophene) polystyrene sulfonate (PEDOT/PSS). The first and second electrodes 7, 8 may be formed from a metal mesh; nanowires, optionally silver nanowires; graphene; and carbon nanotubes.

The front end module 3 is coupled to the first touch sensor 2 via terminal A in order to receive an input signal 10 from the first electrode 7. The front end module 3 includes a first stage 11 in the form of an amplification stage, and a second stage in the form of a first frequency-dependent filter 12 and a second frequency-dependent filter 13. The first stage 11 receives the input signal 10 from the first electrode 7, and provides an amplified signal 14 based on the input signal 10. The first frequency-dependent filter 12 receives and filters the amplified signal 14 to provide a first filtered signal 15 having a first frequency bandwidth. The second frequency-dependent filter 13 receives and filters the amplified signal 14 to provide a second filtered signal 16 having a second frequency bandwidth. The second frequency bandwidth has a relatively larger upper-frequency than the first frequency bandwidth.

The first stage 11 may receive an alternating signal 17, $V_{sig}(t)$ supplied by a signal source 18. The amplified signal 14 may be based on the input signal 10 and the alternating signal 17. In general, the alternating signal 17 may be any alternating signal which is suitable for use in determining the self-capacitance or mutual capacitance of an electrode of a projected capacitance touch panel.

The first apparatus may be configured to drive the first or second electrode 7, 8 of the touch sensor 2 using the alternating signal 17, $V_{sig}(t)$ as a capacitance measurement signal, such that the input signals 10 received from the first electrode 7 vary in dependence upon a capacitive coupling between the first and/or second electrodes 7, 8 and the alternating signal 17, $V_{sig}(t)$, and in dependence upon, a strain of the layer of piezoelectric material 9.

The first, and second frequency dependent filters 12, 13 may be hardware filters such as, for example, active or passive filtering circuits. Alternatively, the amplified signal 14 may be converted into a digital signal by an analog-to-digital convener (ADC) and the first and second frequency dependent filters 12, 13 may be implemented in the digital domain using, for example, one or more microprocessors, microcontrollers, field programmable gate arrays or other suitable data processing devices. Thus, in some examples, the first and second frequency dependent filters 12, 13 may not form part of the analog front end 3, and may instead be implemented by the controller 19. Implementation of the first and second frequency dependent filters 12, 13 of the second stage in hardware or in the digital domain have, been described in WO 2016/102975 A2.

The present application is primarily concerned with an implementation of the first and second frequency dependent filters 12, 13 based on using one or more analog-to-digital converters (ADC) 50 (FIG. 5) to sample the amplified signal 14 at a first, relatively low sampling frequency, $f_{piezo}$, and at a second, relatively high sampling frequency, $f_{cap}$. In effect, sampling by an analog-to-digital converter includes a frequency filtering effect as a consequence of the Nyquist criterion. The present invention is based, at least in part, on the realisation that the first filtered signal 15 corresponding to the piezoelectric response to an applied pressure may be extracted from the combined amplified signal 14 by using an ADC 50 (FIG. 5) synchronised to low level or off periods of the alternating signal 17, $V_{sig}(t)$ used to measure capacitance. In other words, the first filtered signal 15, which is a signal indicative of an applied pressure, may be obtained by sampling the amplified signal 14 at times corresponding to the amplitude, of the alternating signal 17, $V_{sig}(t)$ being substantially equal to a ground, common mode or minimum value. The second filtered signal 16 representing the capacitance may be obtained by sampling at a higher frequency $f_{cap}$, followed by filtering in the digital domain by the controller 19 to remove low frequency components. For example, the controller 19 may apply a high pass filter. An alternative approach is to treat the signal due to the piezoelectric response as a slowly varying baseline—for example, the most recently obtained sample of the first filtered signal 15 may be stored and used as a DC offset for correcting samples of the second filtered signal 16 obtained at the higher sampling frequency $f_{cap}$.

In the present specification, the pressure signal filter 12 may therefore take the form of an ADC 50 (FIG. 5) which is a part of the front end 3, or which is integral with the controller 19. Similarly, the capacitance signal filter 13 may be a part of the front end 3, may be implemented by the controller 19, or the capacitance signal filter 13 may be implemented by the front end 3 and the controller 19 in combination.

The input signal 10 is produced in response to a user interaction with the touch sensor 2, or with a layer of material overlying the touch sensor 2. In the following description, reference to a "user interaction" shall be taken to include a user touching or pressing a touch sensor, a touch panel or a layer of material overlying either. The term "user interaction" shall be taken to include interactions involving a user's digit or a stylus (whether conductive or not). The term "user interaction" shall also be taken to include a user's digit or conductive stylus being proximate to a touch sensor or touch panel without direct physical contact.

The terminal B may couple the second electrode 8 to ground, to a common mode voltage $V_{CM}$, to a signal source 18 providing an alternating signal 17, $V_{sig}(t)$ or to another front end module 3 (not shown in FIG. 1). Alternatively, the terminal B may be connected to the same front end module 3, such that the front end module 3 is connected across the terminals A and B.

The terminals A, B, and other terminals denoted herein by capitalised Latin letters are used as reference points for describing electrical coupling between electrodes and other, elements of an apparatus. Although the terminals A, B may actually be physical terminals, the description that an element, for example a front end module 3, is coupled to a terminal, for example, the terminal A, shall be taken to also encompass the possibility that the front end module may be directly coupled to the first electrode 8. Similarly for other elements and other terminals denoted by capitalised Latin letters.

The controller 19 receives the first and second filtered signals 15, 16. In some examples, the controller 19 may also serve as the signal source 18 providing an alternating signal 17, $V_{sig}(t)$. The controller 19 calculates pressure values 20 based on the first filtered signal 15 and capacitance values 21 based on the second filtered signal 16. The pressure values 20 depend upon a deformation, which may be a strain, applied to the layer of piezoelectric material 9 and corresponding to a user interaction. The capacitance values 21 depend upon the sells-capacitance of the first electrode 7 and/or a mutual capacitance between the first and second electrodes 7, 8. The capacitance values 22 vary in response to a user interaction involving a digit or a conductive stylus.

In this way, pressure and capacitance measurements may be performed using the touch sensor 2 without the need for separate pressure and capacitance electrodes. A single input signal 10 is received from the first electrode 7 which includes pressure and capacitance information. Additionally, the input signal 10 may be amplified and processed using a single front end module 3. This can allow the apparatus 1 to be more readily integrated into existing projected capacitance touch panels.

The layer structure 4 may include only the layer of piezoelectric material 9 such that the first and second opposite faces 5, 6 are faces of the piezoelectric material layer 9. Alternatively, the layer structure 4 may include one or more dielectric layers which are stacked between the layer of piezoelectric material 9 and the first face 5 of the layer structure 4. The layer structure 4 may include one or more dielectric layers stacked between the second face 6 of the layer structure 4 and the layer of piezoelectric material 9. Preferably, one or more dielectric layer(s) include layers of a polymer dielectric material such as polyethylene terephthalate (PET), or layers of pressure sensitive adhesive (PSA) material. However, one or more dielectric layer(s) may include layers of a ceramic insulating material such as aluminium oxide.

In FIG. 1, the first and second faces 5,6 and the layers of die layer structure 4 are shown extending along orthogonal axes labelled x and y, and the thickness direction of each layer of the layer structure 4 is aligned with an axis labelled z, which is orthogonal to the x and y axes. However, the first, second and thickness directions need not form a right handed orthogonal set as shown. For example, the first and second directions x, y may intersect at an angle of 30 degrees or 45 degrees or any other angle greater than 0 degrees and less than 90 degrees.

Figure 2:
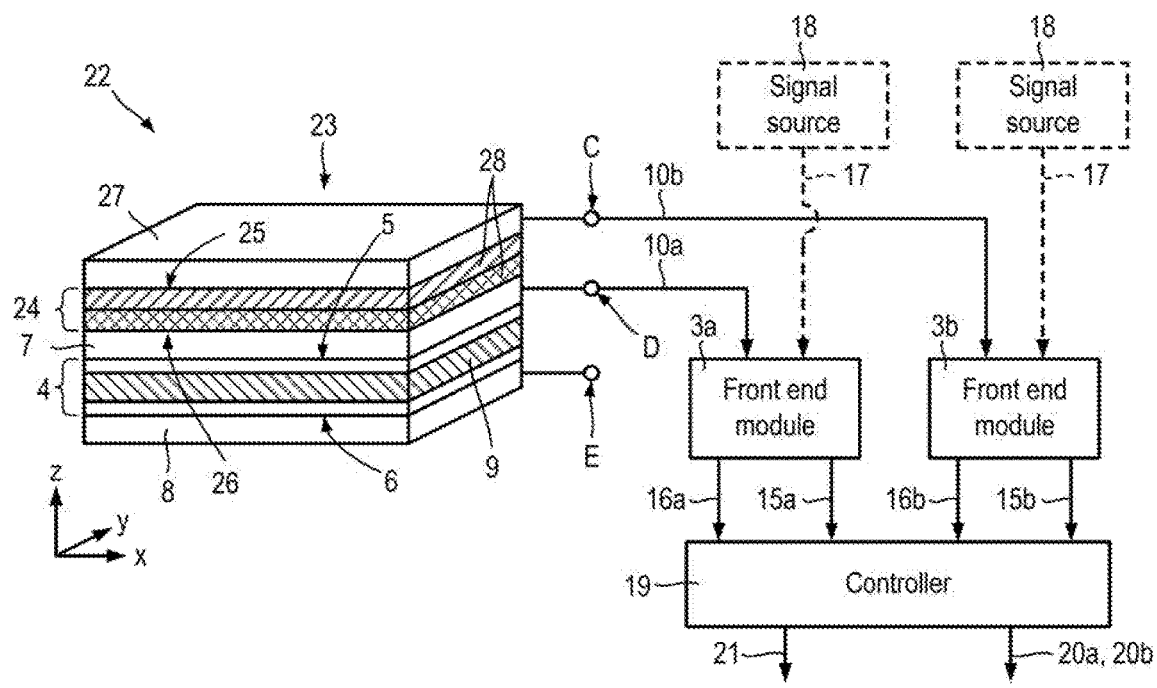
FIG. 2 illustrates a second apparatus for combined capacitive and pressure sensing.

Second combined capacitance an pressure sensing apparatus and second touch sensor: Referring also to FIG. 2, a second apparatus 22 is shown which includes a second touch sensor 23, a first front end module 3a, a second front end module 3b and a controller 19.

The second touch sensor is similar to the first touch sensor 2, except that the second touch sensor 23 also includes a second layer structure 24 having third face 25 and a fourth, opposite, face 26, and a third electrode 27. The second layer structure 24 includes one or more dielectric layers 28. Each dielectric layer 28 is generally planar and extends in first x and second y directions which are perpendicular to a thickness direction. The one or more dielectric layers 28 of the second layer structure 24 are arranged between the third and fourth faces 25,26 such that the thickness direction z of each dielectric layer 28 of the second layer structure 24 is perpendicular to the third and fourth faces 25, 26. The third electrode 27 is disposed on the third face 25 of the second layer structure 24, and the fourth face 26 of the second layer structure 24 contacts the first electrode 7.

Preferably, the dielectric layer(s) 28 include layers of a polymer dielectric material such as PET or layers of PSA materials. However, the dielectric layer(s) 28 may include layers of a ceramic insulating material such as aluminium oxide. Preferably, the third electrode 27 is made of indium tin oxide (ITO) or indium zinc oxide (IZO). However, the third electrode 27 may be a metal mesh film such as aluminium, copper, silver or other metals suitable for deposition and patterning as a thin film. The third electrode 27 may be made of a conductive polymer such as poly aniline, polythiphene, polypyrrole or poly(3,4-ethylenedioxythiophene) polystyrene sulfonate (PEDOT/PSS).

The first and second front end modules 3a, 3b are the same as the from end module 3. The first front end module 3a is coupled to the second touch sensor 23 via a terminal D in order to receive a first input signal 10a from the first electrode 7. The second front end module 3b is coupled to the second touch sensor 23 via a terminal C in order to receive a second input signal 10b from the third electrode 27. A terminal E may couple the second, electrode 8 to ground, common mode voltage $V_{CM}$, or to a signal source 18 providing an alternating signal 17, $V_{sig}(t)$. Alternatively, the terminal E may be coupled to the first front end module 3a such that the first front end module 3a is connected across the terminals D and E, and the terminal E may also be coupled to the second front end module 3b such that the second front end module 3b is connected across the terminals C and E. One or both of the first and second front end modules 3a and 3b may be connected to a signal source 18 in order that the corresponding first stage(s) 11 may receive an alternating signal 17, $V_{sig}(t)$.

The controller 19 receives first and second filtered signals 15a, 16a from the first front end module 3a and first and second filtered signals 15b, 16b from the second front end module 3b. The controller 19 calculates first pressure values 20a based on the first filtered signal 15a from the first front end module 3a and second pressure values 20b based on the first filtered signal 15b from the second front end module 3b. The content of pressure values 21 depends on a measurement mode of the controller 19. The controller 19 may be operable in a self-capacitance measurement mode or a mutual capacitance measurement mode, and may be switchable between measurement modes. When self-capacitances of the first and third electrodes 7, 27 are measured, the controller 19 calculates self-capacitance values for the first electrode 7 based on the second filtered signal 16a from the first front end module 3a and self-capacitance values for the third electrode 27 based on the second filtered signal 16b from the second front end module 3b. When a mutual capacitance between the first and third electrodes 7, 27 is measured, the controller 19 calculates the mutual capacitance based on the second filtered signals 16a, 16b from both first and second front end modules 3a, 3b.

The pressure values 20a, 20b depend upon a deformation applied to the layer of piezoelectric material 9 by a user interaction. The capacitance values 21 may include self-capacitances of the first and third electrodes 7, 27, or, a mutual capacitance measured between the first and third electrodes 7, 27, depending on the operation mode of the controller 19. The capacitance values 21 vary in response to a user interaction involving a digit or a conductive stylus.

The second layer structure 24 may include only a single dielectric layer 28, such that the third and fourth opposite faces 25, 26 are facts of a single dielectric layer 28. Alternatively, a second layer structure 24 need not be used, and the third electrode 27 may be disposed on the first face 5 along with the first, electrode 7. In FIG. 2, the third and fourth faces 25, 26 and the dielectric layers 28 of the second layer structure 24 are shown extending along orthogonal axes labelled x and y, and the thickness direction of each dielectric layer 28 of the second layer structure 24 is aligned with an axis labelled z which is orthogonal to the x and y axes. However, the first, second and thickness directions need not form a right handed orthogonal set as shown.

Figure 3:
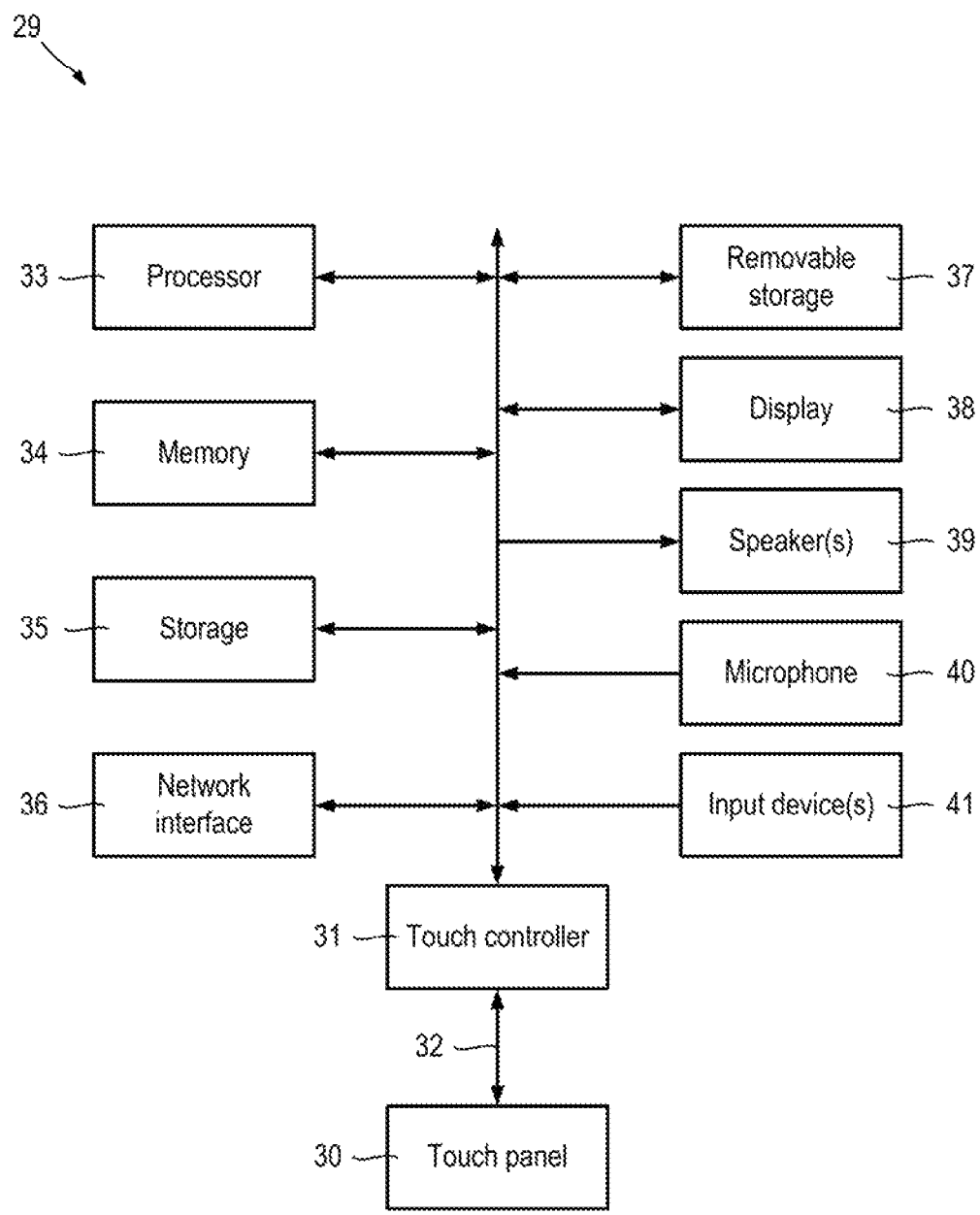
FIG. 3 illustrates an electronic device incorporating a touch panel.

Electronic device: Referring also to FIG. 3, an electronic device 29 may include a touch panel 30 and a touch controller 31 for providing combined capacitive and pressure sensing.

The electronic device 29 may be a relatively immobile electronic device such as, for example a desktop computer, an automated teller machine (ATM), a vending machine, a point of sale device, or a public access information terminal. Alternatively, an electronic device 29 may be a portable electronic device such as, a laptop, notebook or tablet computer, a mobile phone, a smart phone, a personal data assistant or a music playing device. The electronic device 29 includes a touch panel 30 including one or more touch sensors 2, 23. The touch panel 30 is coupled to a touch controller 31 including, for example, one or more front end modules 3 by a link 32. In a case where the link 32 is a multiplexed link, one front end module 3 may receive input signals 10 from multiple touch sensors 2, 23. For example, using a multiplexed link 32 the touch controller 31 may include one front end module and the touch panel 30 may include two, four, eight, sixteen, thirty two, sixty four, one hundred and twenty eight, two hundred and fifty six or more touch sensors 2, 23. The number of touch sensors 2, 23 coupled to a front end module 3 by a multiplexed link 32 need not be a power of two.

The electronic device 29 may include a processor 33 for executing programs and processing information. The electronic device 29 may include a memory 34 such as a volatile random access memory, for temporarily storing programs and information, and/or storage 35 such as non-volatile random access memory (NVRAM) or a hard disc drive (HDD) for long term storage of programs and information. The electronic device 29 may include a network interface 36 for transmitting and/or receiving information from wired or wireless communication networks. The electronic device 29 may include a removable storage interface 37 which can interface with removable storage media to read and/or write programs and information. The electronic device 29 may include output means such as a display 38 and/or speaker(s) 39. The display 38 may be any type of display such as, for example, an liquid crystal display (LCD), a light emitting diode display (LED), an organic LED display, an electrophoretic display or other type of electronic-ink display.

The touch controller 31 provides input information to the electronic device 29 which corresponds to user interactions with the touch panel 30. For example, input information may be the locations and/or pressures of one or more user interactions. The electronic device may include other input means such as a microphone 40, or other input devices 41 such as, for example, a keyboard, keypad, mouse or trackball. When the touch panel 30 includes a plurality of touch sensors 2, 23, the touch controller 31 may provide positional information in the form of coordinates and/or pressures corresponding to one user interaction or two or more simultaneous user interactions with the touch panel 30.

The touch panel 30 may be provided overlying the display 38, such that the touch panel 30 and display 38 provide a touch screen. Alternatively, the touch sensors 2, 23 of the touch panel 30 may be integrated into or embedded within the display 38. When the touch panel 30 is used overlying or integrated, into the display 38, the layer structure(s) 4, 24 and electrodes 7, 8, 27 may be transparent or substantially transparent. For example, the layer structure(s) 4, 24 and electrodes 7, 8, 27 may transmit 50% or more, preferably at least 75%, preferably at least 90% of light in visible wavelengths. For example, the piezoelectric material may be PVDF, dielectric layers included in the layers structures 4, 24 may be PET or an optically transparent or substantially transparent PSA, and the electrodes 7, 8, 27 may be ITO. Alternatively, the electrodes 7, 8, 27, and any connections thereto, may be opaque and sufficiently thin m a direction perpendicular to the thickness direction z that they are not immediately noticeable to the human eye, for example, electrodes, and any connections thereto, may be formed of mesh having tracks less than 100 micrometers ($1'10^{-4}$ m) wide, less than 10 micrometers ($1 \times 10^{-5}$ m) wide or thinner.

Figure 4:
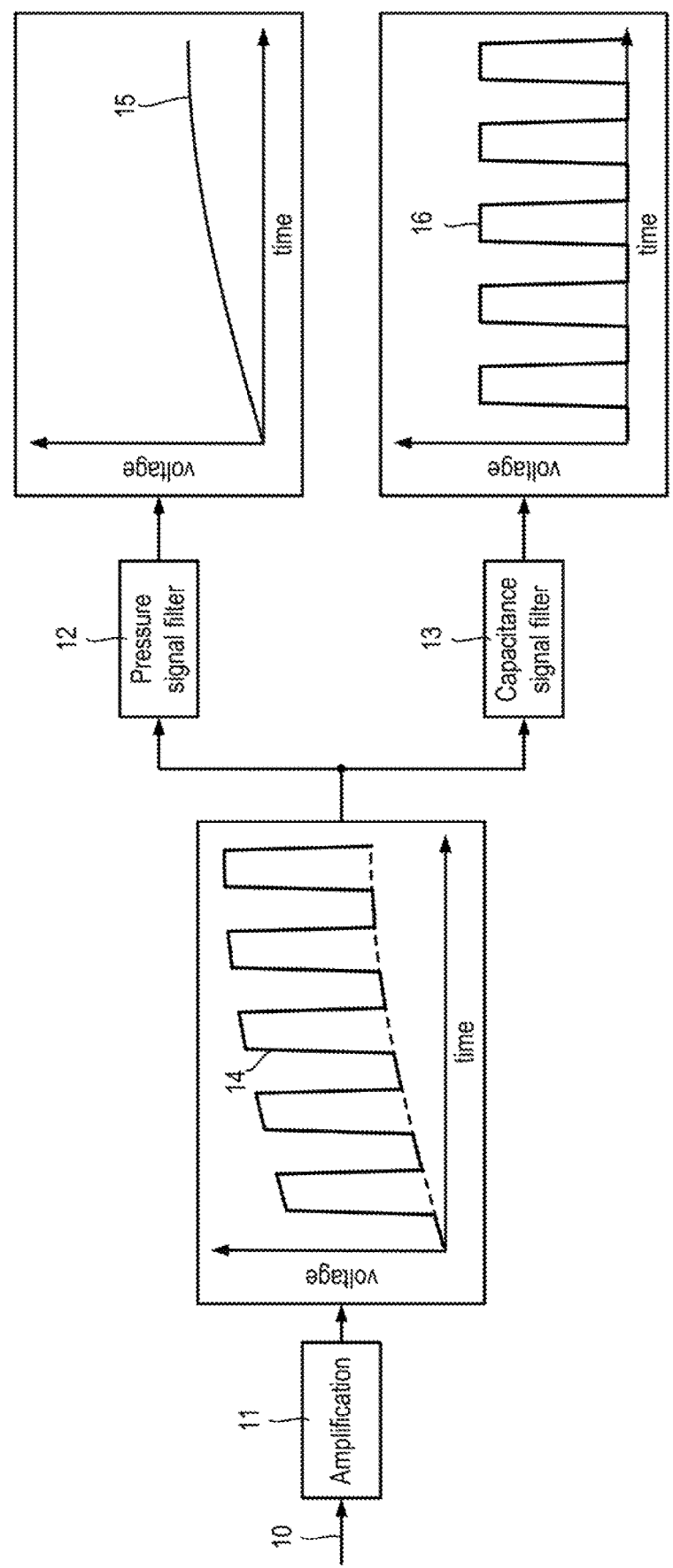
FIG. 4 illustrates separation of a single signal into pressure and capacitance signals.

Operation of the first and second apparatuses: Referring also to FIG. 4, separation of pressure and capacitance signals will be explained.

The layer of piezoelectric material 9 is poled such that a polarisation P of the layer of piezoelectric material 9 will be generated by the application of a pressure (or stress or force) applied in the thickness direction z which results from a user interaction with the touch sensor 2, 23. The polarisation P of the layer of piezoelectric material results in an induced electric field $E_p$, which has a component $E_z$ in the thickness direction. The deformation which produces the polarisation P may result from a compression or a tension. The deformation which produces the polarisation P may include an in-plane stretching of the piezoelectric material layer 9 in response to the applied pressure.

The induced electric field $E_p$ produces a potential difference between the first and second electrodes 7,8 of the first or second touch sensors 2, 23. The induced electric field $E_p$ produces a potential difference between the third and second electrodes 27, 8 of the second touch sensor 23, if a conductive path is provided between the first or third electrodes 7, 27 and the second electrode 8, charges will flow between them until the induced electric field $E_p$ is cancelled by an electric field $E_q$ produced by the charging of the electrodes 7, 8, 27. Intimate contact between the layer of piezoelectric material 9 and the electrodes 7,8, 27 is not required, provided that intervening layers of the layer structures 4, 24 are not excessively thick. A potential difference may be produced between the third and second electrodes 27, 8 of the second touch sensor 23 provided that the first electrode 7 is arranged such that the third electrode 27 is not entirely screened from the induced electric field $E_p$.

The input signal 10 received from the first electrode 7 or the third electrode 27 includes a current signal $I_{piezo}(t)$ which depends upon the induced electric field $E_p$. Generally, a greater deformation applied to the layer of piezoelectric material 9 will result in a greater magnitude of $I_{piezo}(t)$. The first stage 11 includes a circuit providing an integrating amplifier which integrates the current signal $I_{piezo}(t)$ and multiplies by a gain G in order to provide an integrated output voltage signal $V_{piezo}(t)$. The gain G need not be fixed, and in general may be by a function of time, frequency and/or the electrical parameters of a feedback network included in the first stage 11.

The amplified signal 14 is approximately a superposition of the integrated output voltage signal $V_{piezo}(t)$ and a capacitance measurement voltage signal $V_{cap}(t)$. The capacitance voltage signal $V_{cap}(t)$ is an alternating signal having a basic frequency of $f_d$. The capacitance voltage signal $V_{cap}(i)$ is based on the capacitance of the touch sensor 2, 23 and an alternating signal 17, $V_{sig}(t)$ provided by a signal source 18.

For the first touch sensor 2, a signal source 18 may be coupled to the front end module 3 or to the second electrode 8 via terminal B. For the second touch sensor 23, signal source(s) 18 may be coupled to one or both of the first and second front end modules 3a, 3b, or to the second electrode 8 via terminal E. The signal source 18 may be a voltage controlled source. The signal source 18 may be the controller 19, or a driving output of a separate projected capacitive touch controller.

The signal source 18 may provide an alternating signal 17, $V_{sig}(t)$ having a sinusoidal, square, triangular or saw-toothed waveform. The signal source 18 may provide a periodic signal comprising a superposition of two or more sinusoidal waveforms having different frequencies. The alternating signal 17, $V_{sig}(t)$ may be any signal suitable for measuring the self-capacitance or mutual capacitance of an electrode of a projected capacitance touch panel. Preferably, the alternating signal 17, $V_{sig}(t)$ is a pulsed or stepped signal for measuring the self-capacitance of an electrode or the mutual capacitance between a pair of electrodes.

Preferably, the front end module 3 receives the alternating signal 17, $V_{sig}(t)$ and the first stage 11 provides the amplified, signal 14 based on the input signal 10 and the alternating signal 17, $V_{sig}(t)$. An electrode 7, 8 of the touch, sensor 2 is driven using the alternating signal 17, $V_{sig}(t)$ as a capacitance measurement signal. For example, the second electrode 8 may be driven at the alternating signal 17, $V_{sig}(t)$. Alternatively, the second electrode 8 may be held at a ground or common mode potential and the first electrode 7 may be driven by the inverting input of an operational amplifier forming part of the first stage 11, by supplying the alternating signal 17, $V_{sig}(t)$ to the corresponding non-inverting input. In either approach, input signals 10 received from the first electrode 10 may be caused to vary in dependence upon a capacitive coupling between the first electrode 7 and the alternating signal 17, $V_{sig}(t)$, and in dependence upon a strain of the layer of piezoelectric material 9 proximate.

The amplified signal 14 is approximately a superposition of the integrated output voltage signal $V_{piezo}(t)$ and the capacitance measurement voltage signal $V_{cap}(t)$. However, the integrated output voltage signal $V_{piezo}(t)$ and the capacitance measurement voltage signal $V_{cap}(t)$ generally have different frequency contents. These different frequency contents facilitate separation using the first and second frequency-dependent filters 12, 13 or, in the present specification, using one or more ADCs 50, 51 (FIG. 5) operating at first and second sampling frequencies $f_{piezo}$, $f_{cap}$. Where a user interaction does not apply a pressure to the layer of piezoelectric material 9 the contribution of the integrated output voltage signal $V_{piezo}(t)$ to the amplified signal 14 may be zero or negligible.

Self capacitances of the first or third electrodes 7, 27, or mutual capacitances between any pair of the first, second or third electrodes 7, 8, 27 may typically fall within the range of 0.1 to 3000 pF or more, and preferably 100 to 2500 pF. In order to effectively couple to capacitances in this range, the alternating signal 17, $V_{sig}(t)$ may typically have a base frequency of greater than or equal to 10 kHz, greater than or equal to 20 kHz, greater than or equal to 50 kHz or greater than or equal to 100 kHz.

By contrast, the integrated output voltage signal $V_{piezo}(t)$ typically includes a broadband frequency content spanning a range from several Hz to several hundreds or thousands of Hz. This is at least in part because the integrated output voltage signal $V_{piezo}(t)$ arises from user interactions by a human user.

Preferably, the first frequency-dependent filter 12 attenuates the capacitance measurement voltage signal $V_{cap}(t)$ such that the first filtered signal 15 is not based on the alternating signal 17, $V_{sig}(t)$. Preferably, the first filtered signal 15 is substantially equal to the integrated output voltage signal $V_{piezo}(t)$, or at least is primarily based on the piezoelectric current $I_{piezo}(t)$. In the present specification, the first frequency-dependent filter 12 is implemented using an ADC 50 (FIG. 5) synchronised to sample the first filtered, signal 15 at times corresponding to the amplitude of the alternating signal 17, $V_{sig}(t)$ and capacitance measurement voltage signal $V_{cap}(t)$ being substantially equal to a ground, common mode or minimum value.

The first filtered signal 15 is generated by sampling the amplified signal 14 at times corresponding to the amplitude of the alternating signal 17, $V_{sig}(t)$ being substantially equal to a ground, common mode or minimum value. For example, if the alternating signal 17, $V_{sig}(t)$ is a 10 kHz pulsed wave alternating between an off state of 0 V and an on state of $V_{pulse}$, then the first frequency $f_{piezo}$ would be 10 kHz with sampling times synchronised to the periods when $V_{sig}(t)=0$ V, i.e. during minima of the capacitance measurement signals. The value of 0 V is merely an example, and in other examples a different reference voltage level may be used such as, for example, a ground or common mode potential of a device incorporating the apparatus 1, 22. By contrast, the second frequency $f_{cap}$ would need to be a multiple of at least several times 10 kHz in order to capture sufficient details to determine a capacitance value.

In some examples, the synchronisation may need to take account of a phase shift between the alternating signal 17, $V_{sig}(t)$ and capacitance measurement voltage signal $V_{cap}(t)$. For example, by adjusting the duration of a period of ground, common mode or minimum signal level of the alternating signal 17. $V_{sig}(t)$ such that there is overlap with a period of ground, common mode or minimum signal level of the capacitance measurement voltage signal $V_{cap}(t)$ within an expected or calibrated range of capacitance values. The capacitance measurement voltage signal $V_{cap}(t)$ may be a transmitted or driving signal, or may be a received signal.

Preferably, the second frequency-dependent filter 13 selects the capacitance measurement voltage signal $V_{cap}(t)$ such that the second filtered signal 16 is based on the alternating signal 17. $V_{sig}(t)$ and the capacitance of the touch sensor 2, 23. Preferably, the second filtered signal 16 is substantially equal to the capacitance measurement voltage signal $V_{cap}(t)$, or is at least primarily based on the alternating signal 17, $V_{sig}(t)$. In the present specification, the second frequency-dependent filter 13 may be implemented in the digital domain following initial sampling of the amplified signal 14 at the second sampling frequency $f_{cap}$. For example, the controller 19 may implement the second frequency-dependent filter 13 by applying a high-pass filter. Alternatively, since the integrated output voltage signal $V_{piezo}(t)$ varies at frequencies several orders of magnitude below typical capacitance measurement signals $V_{cap}(t)$, the most recent sample or samples from the first filtered signal 15 may be used as a flat or interpolated baseline for subtraction from the sampled values of the amplified signal 14 to obtain the second filtered signal 16.

Further details of the implementation of the first and second frequency dependent filters 12,13 are described hereinafter with reference to FIGS. 6A to 6C.

In this way, the amplitude of the first filtered signal 15 is dependent upon a pressure applied to the layer of piezoelectric material 9 by a user interaction, and the amplitude of the second filtered signal 16 is dependent upon a capacitance of the touch sensor 2,23 as modified by the proximity of a user's digit or conductive stylus.

The first stage 11 has a frequency response having a low frequency cut-off $f_l$ and a high frequency cut-off $f_u$. Below the tow frequency cut-off $f_l$ and above the high frequency cut-off $f_u$ the gain G of die first stage 11 drops rapidly so that frequencies outside the range between $f_l$ and $f_u$ are blocked. The high frequency cut-off $f_u$ is greater than the base frequency $f_d$ of the alternating signal 17. $V_{sig}(t)$ for capacitance measurements. The low-frequency cut-off $f_l$ is preferably at least 1 hertz, or at least sufficiently high to substantially block voltage signals resulting from a pyroelectric effect in the layer of piezoelectric material 9 which result from the body temperature of a user's digit. For application in an industrial or domestic environment, the low frequency cut-off $f_l$ may be at least 50 Hz, at least 60 Hz or at least sufficiently high to reject noise pick-up at a frequency of a domestic of industrial power distribution network and resulting from ambient electric fields. The low frequency cut-off $f_l$ may be at least 100 Hz. The low frequency cut-off $f_l$ may be at least 200 Hz. For application in aircraft, the low frequency cut-off $f_l$ may be at least 400 Hz. Frequency cut-offs may corresponds to 3 dB attenuation.

First touch panel system: Touch panel systems including touch panels including multiple touch sensors 2, 23 combined with apparatus for combined capacitance and pressure sensing have been described in WO 2016/102975 A2, in particular with reference to FIGS. 15 to 18, 21, and 25 to 29 of this document.

In the touch panel systems described in WO 2016/102975 A2, the first and second frequency dependent filters 12, 13 are implemented in hardware as a part of front end modules, or in the digital domain, for example by a controller. By contrast, touch panel systems of the present specification implement the first frequency dependent filter 12 using an analog-to-digital converter (ADC) 50 (FIG. 5) which is synchronised with the alternating signal 17, $V_{sig}(t)$ at a first sampling frequency $f_{piezo}$. Touch panel systems of the present specification implement the second frequency dependent filler 13 in the digital domain. For example, by application of a digital high-pass filter, or by using the more recently sample value or values of the first filtered signal 15 as a correction for the underlying variation of the output signal $V_{piezo}(t)$.

An advantage of the examples of the present specification, as compared to the touch panel systems described in WO 2016/102975 A2, is that obtaining the first filtered signal 15 using a synchronised ADC may allow for a reduced hardware footprint as compared to a separate active or passive hardware filler. This is because an ADC is required in any event for input to a controller or other data processing apparatus. Additionally, compared to implementing the first frequency dependent filter 12 in the digital domain, obtaining the first filtered signal 15 using a synchronised ADC reduces the data processing requirements of a touch panel system. Although the second frequency dependent filter 13 is still implemented in the digital domain, isolating the second filtered signal 16 from the amplified signal 14 is relatively more reliable than isolating the first filtered signal 15, because the amplitude of the second filtered signal 16 is typically larger, or significantly larger, than the amplitude of the first filtered signal 15.

In the touch panel systems described in WO 2016/102975 A2, each front end module 3 is connected to a number of electrodes using a multiplexer. In other words, electrode input signals 10 are multiplexed before amplification. Such systems are simple in that large numbers of front end modules 3 and first stages 11 are not required. In this way, multiplexing the electrode input signals 10 before amplification allows the size and complexity of an apparatus for connection to a touch panel to be minimised.

However, in addition to the advantages of obtaining the first filtered signal 15 using a synchronised ADC, it has been surprisingly realised that, despite increasing the overall size and complexity of an apparatus for combined capacitance and pressure sensing, multiplexing the amplified signals 14 instead of the input signals 10 may provide improved performance, as described hereinafter.

Figure 5:
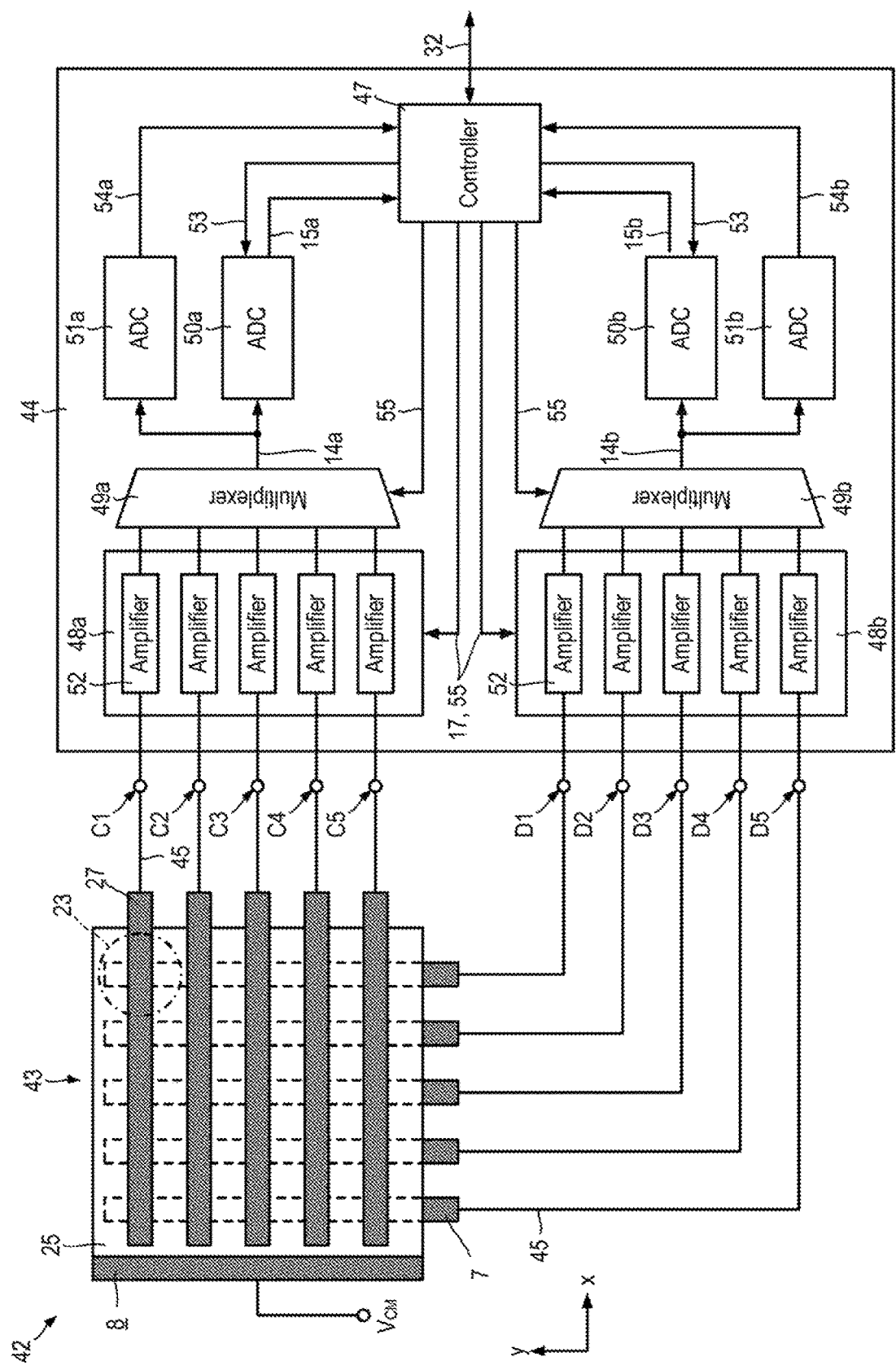
FIG. 5 illustrates a first touch panel system.

Referring also to FIG. 5, a first touch panel system 42 includes a first touch panel 43 and a first touch controller 44 for combined pressure and capacitance sensing.

The first touch panel 43 includes first and second layer structures 4, 24 which are generally the same as the layer structures 4, 24 of the second touch sensor 23, except that multiple first electrodes 7 are disposed on the first face 5 of the first layer structure 4 and that multiple third electrodes 27 are disposed on the third face 25 of the second layer structure 24.

The first electrodes 7 each extend in the second direction y and the first electrodes 7 are disposed in an array evenly spaced in the first direction x. The third electrodes 27 each extend in the first direction x and the third electrodes 27 are disposed in an array evenly spaced in the second direction y. Each first electrode 7 and each third electrode 27 is coupled to a corresponding conductive trace 45. The second electrode 8 is disposed on the second face 6 of the first layer structure 4 and is extensive such that the second electrode 8 at least partially underlies each first electrode 7 and each third electrode 27. The second electrode 8 may be substantially coextensive with the second face 6 of the first layer structure 4. The second electrode 8 is connected to a common mode voltage $V_{CM}$.

In this way, the area around each intersection of a first electrode 7 with a third electrode 27 effectively provides a second touch sensor 23.

The first touch panel 43 may be bonded overlying the display 38 of an electronic device 29. In this case, the materials of the first touch panel 43 should be substantially transparent as described hereinbefore. A cover lens 46 (FIG. 21) may be bonded overlying the first, touch panel 43. The cover lens 46 (FIG. 21) is preferably glass but may be any transparent material. The cover lens 46 (FIG. 21) may be bonded to the first touch panel 43 using a layer of pressure sensitive adhesive (PSA) material 109 (FIG. 22). The layer of PSA material 109 (FIG. 2) may be substantially transparent. The first and third electrodes 7, 27 may be fabricated using index matching techniques to minimise visibility to a user.

The first touch controller 44 includes a controller 47, a pair of amplifier modules 48a, 48b a pair of multiplexers 49a, 49b, a pair of primary ADCs 50a, 50b and a pair of secondary ADCs 51a, 51b. The controller 47 may communicate with the processor 33 of the electronic device 29 using a link 32. The controller 47 includes a signal source 18 for providing the alternating signal 17, $V_{sig}(t)$ to one or both of the amplifier modules 48a, 48b.

The amplifier modules 48a, 48b are similar to the first stage 11, except that each amplifier module 48a, 48b includes a number of separate charge amplifiers 52. Each charge amplifier 52 of the first amplifier module 48a is connected to a corresponding third electrode 27 via a respective terminal C1, . . . , C5 and conductive trace 45. The output of each charge amplifier 52 of the first amplifier module 48a is connected to a corresponding input of the first multiplexer 49a. In this way, the first multiplexer 49a may output an amplified signal 14a corresponding to an addressed third electrode 27.

The first primary ADC 50a receives the amplified signal 14a corresponding to a presently addressed third electrode 27 from the first multiplexer 49a output. The first primary ADC 50a also receives a synchronisation signal 53 from the controller 47 (also referred to as a "clock signal"). The synchronisation signal 53 triggers the first primary ADC 50a to obtain samples at the first sampling frequency $f_{piezo}$ and at times corresponding to the amplitude of the alternating signal 17, $V_{sig}(t)$ being substantially equal to a ground, common mode or minimum value. In this way, the first primary ADC 50a may obtain the first filtered signal 15a in the form of a sampled first filtered signal 15a which corresponds approximately to values of the integrated output voltage signal $V_{piezo}(t)$ at the sampling times. The synchronisation signal 53 need not trigger the first primary ADC 50a to obtain samples during every single period of the alternating signal 17, $V_{sig}(t)$, and instead may trigger the first primary ADC 50a to obtain samples during, for example, every other period, every tenth period, every hundredth period and so forth.

Figure 6A:
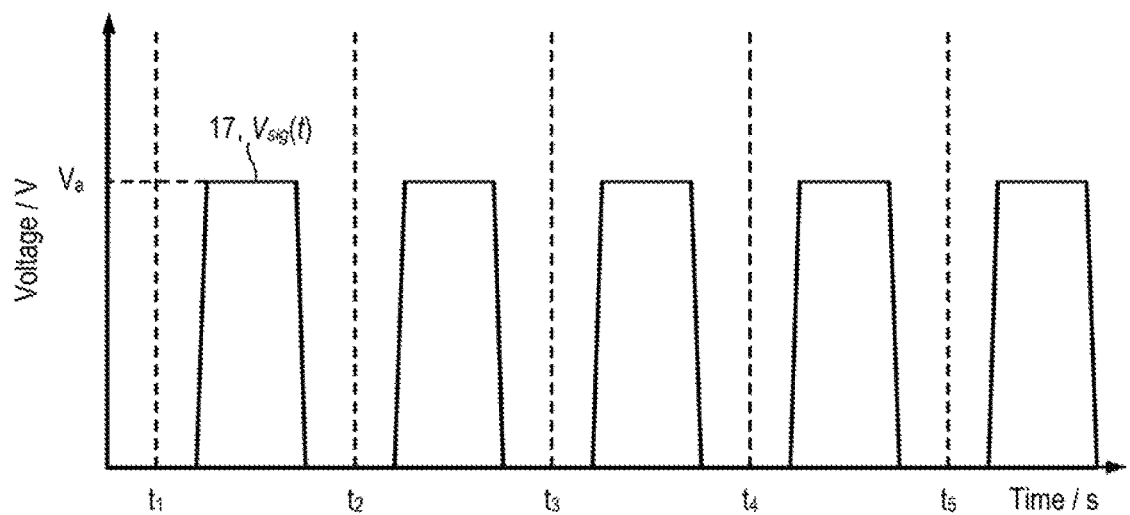
FIGS. 6A to 6C illustrate using synchronised sampling to obtain a pressure signal.
Figure 6B:
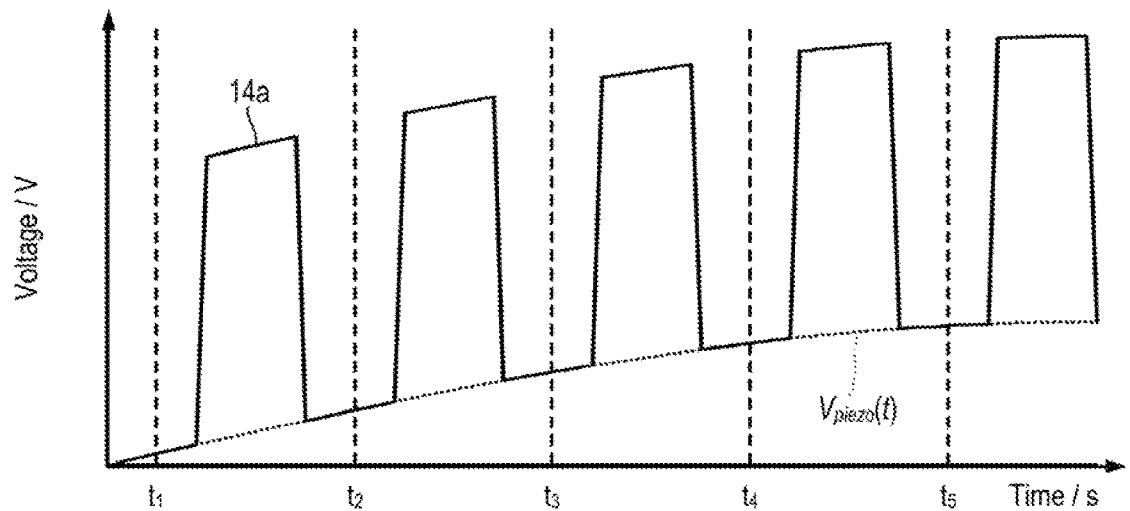
Figure 6C:
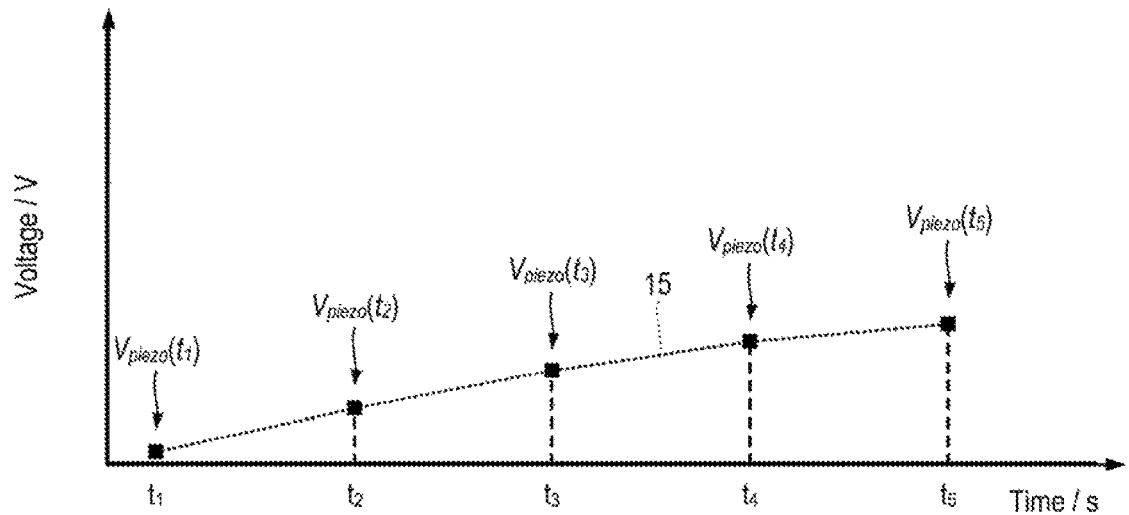

For example, referring also to FIGS. 6A to 6C, an example of obtaining the first filtered signal 15a is illustrated. For visual purposes, in FIGS. 6A to 6C, the capacitance measurement voltage signal $V_{cap}(t)$ and, the integrated output voltage signal $V_{piezo}(t)$ have been illustrated with much smaller disparities in frequency and amplitude than would be expected in practice. In practice, the capacitance measurement voltage signal $V_{cap}(t)$ would be expected to have a significantly larger amplitude and to vary at a frequency several orders of magnitude larger than the integrated output voltage signal $V_{piezo}(t)$.

Referring in particular to FIG. 6A, an example of the alternating signal 17, $V_{sig}(t)$ may have the form a pulsed wave with a 50:50 duty ratio, an amplitude of $V_a$ and a period of $1/f_d$. In this example, the synchronisation signal 53 triggers the first primary ADC 50a at approximately the midpoint of the alternating signal 17, $V_{sig}(t)$ minimum, or zero, period. For example, the first primary ADC 50a may obtain a sample at times $t_1$, $t_2=t_1+1/f_d$, $t_3=t_1+2/f_d$ and so forth.

Referring in particular to FIG. 6B, as explained hereinbefore, the amplified signal 14a may be approximated as a superposition of the integrated output voltage signal $V_{piezo}(t)$ and the capacitance measurement voltage signal $V_{cap}(t)$. The capacitance measurement voltage signal $V_{cap}(t)$ is related to and has a similar form to the alternating signal 17, $V_{sig}(t)$, and in particular has substantially the same frequency contents. When the capacitance measurement voltage signal $V_{cap}(t)$ is approximately in phase with the alternating signal 17, $V_{sig}(t)$, the synchronisation signal 53 will trigger sampling of the amplified signal 14a at times when the contribution of the capacitance measurement voltage signal $V_{cap}(t)$ to the amplified signal 14a is substantially equal to a ground, common mode or minimum value. In this way, a sampling of substantially only the integrated output voltage signal $V_{piezo}(t)$ may be obtained.

Referring in particular to FIG. 6C, the first filtered signal 15a then takes the form of a sequence of samplings of the integrated output voltage signal $V_{piezo}(t)$ at times $t_1$, $t_2$, $t_3$ and so forth.

With the example of a pulsed wave as shown in FIG. 6A, small phase shifts of up to about φ±π/2 between the capacitance measurement voltage signal $V_{cap}(t)$ and the alternating signal 17, $V_{sig}(t)$, no offset is required between the synchronisation signal 53 and the alternating signal 17, $V_{sig}(t)$ in order to ensure that sampling of the first filtered signal 15a occurs during low or zero signal level of the capacitance measurement voltage signal $V_{cap}(t)$.

For larger phase shifts (p or different waveforms of the alternating signal 17, $V_{sig}(t)$, an offset between the synchronisation signal 53 and the alternating signal 17, $V_{sig}(t)$ may be calibrated so that, within the range of capacitances expected/measured for the corresponding touch panel 43, the synchronisation signal 53 triggers the first primary ADC 50a during a period of low or zero signal level of the capacitance measurement voltage signal $V_{cap}(t)$.

The first secondary ADC 51a receives the amplified signal 14 corresponding to a presently addressed third electrode 27 from the first multiplexer 49a output. The first secondary ADC 51a samples the amplified signal 14a at a sampling frequency $f_{cap}$, which is at least several times the base frequency $f_d$ of the alternating signal 17, $V_{sig}(t)$. The first secondary ADC 51a outputs a digitised amplified signal 54a to the controller 47. The controller 47 receives the digitised amplified signal 54a and, applies a digital high pass filter to obtain the second filtered signal 16 in the digital domain. It will be apparent that the synchronisation signal 53 has the effect of triggering sampling of the amplified signal 14a at times when the amplitude of the digitised amplified signal 54a is substantially equal to a ground, common mode or minimum value. In this sense, the sampling of the first primary ADC 50a is synchronised with the digitised amplified signal 54a.

Alternatively, since the integrated output voltage signal $V_{piezo}(t)$ typically varies at frequencies several orders of magnitude less than the base frequency $f_d$ of the alternating signal 17, $V_{sig}(t)$, the controller 47 may treat the most recently sampled value of the first filtered signal 15, for example $V_{piezo}(t_3)$, as an additional offset and subtract this value from the digitised amplified signal 54a. More accurate baseline corrections may be employed, for example, linear interpolation based on the two most recent sampled values of the first filtered signal 15, or quadratic interpolation based on the three most recently sampled values of the first filtered signal 15.

The primary and secondary ACDs 50, 51 may be the same. However, it may be advantageous for the primary and secondary ADCs 50, 51 to be different. In particular, the primary ADCs 50a, 50b may be optimised for the dynamic range of the integrated output voltage signal $V_{piezo}(t)$, without the need to measure the larger amplitudes corresponding to the capacitance measurement voltage signal $V_{cap}(t)$. Furthermore, because the first sampling frequency $V_{piezo}$ should be at most equal to the base frequency $f_d$ of the alternating signal 17, $V_{sig}(f)$, a lower bandwidth is required for the primary ADCs 50a, 50b compared to the secondary ADCs 51a, 51b. For cost sensitive applications, this enables use of cheaper, ADCs for the primary ADCs 50a, 50b. By contrast, for performance applications, this enables the use of more precise ADCs capable of differentiating a larger number of signal levels within the same dynamic range (a 16-bit ADC is typically slower than an 8-bit ADC all else being equal).

Similarly, each charge amplifier 52 of the second amplifier module 48b is connected to a corresponding first electrode 7 via a respective terminal D1, ..., D5 and conductive trace 45, and the output of each charge amplifier 50 of the second amplifier module 49b is connected to a corresponding input of the second multiplexer 49b. In this way, the second multiplexer 49b may output an amplified signal 14b corresponding to an addressed first electrode 7 for filtering and processing by the second primary ADC 50b, second secondary ADC 51b and the controller 47 in the same way as for signals corresponding to the third electrodes 27. It will be apparent that the synchronisation signal 53 has the effect of triggering sampling of the amplified signal 14b at times when the amplitude of the digitised amplified signal 54b is substantially equal to a ground, common mode or minimum value. In this sense, the sampling of the second primary ADC 50b is synchronised with the digitised amplified signal 54a.

The controller 47 may also provide a second synchronisation signal 55 to the multiplexers 49a, 49b and/or amplifiers 52. The second synchronisation signal 55 may cause the multiplexers 49a, 49b to address each combination of first and third electrodes 7, 27 according to a sequence determined by the controller 47. In this way, the first touch controller 44 may receive amplified signals 14a, 14b from each pairing, of first and third electrodes 7, 27 according to a sequence determined by the controller 47. The sequence may be pre-defined, for example, the sequence may select each pair of a first electrode 7 and a third electrode 27 once before repeating. The sequence may be dynamically determined, for example, when one or more user interactions are detected, the controller 47 may scan the subset of first electrodes 7 and third electrodes 27 adjacent to each detected user interaction in order to provide faster and/or more accurate tracking of user touches. The sequence may be arranged so that the multiplexers 49a, 49b address each pair of first and third electrodes 7, 27 during a quiet period or blanking period of the display 38. The sequence may be provided, to the controller 47 by the processor 33 via the link 32. Alternatively, the processor 33 may directly control the sequence via the link 32.

Based on the obtained first filtered signals 15a, 15b the controller 47 may calculate first pressure values 20a corresponding to the addressed third electrode 27 and second pressure values 20b corresponding to the addressed first electrode 7. The pressure values 20a, 20b may be output via the link 32.

When the first touch controller 44 is operated in a self-capacitance mode, the controller 47 may provide suitable alternating signals 17, $V_{sig}(t)$ to each amplifier 52 of the first and second amplifier modules 48a, 48b. Based on the second filtered signals 16 obtained by the controller 47 in the digital domain, the controller 47 may calculate first capacitance values 21a corresponding to a self-capacitance of the addressed third electrode 27 and second capacitance values 21b corresponding to a self-capacitance of the addressed first electrode 7. The capacitance values 21a, 21b may be output via the link 32.

When the first touch controller 44 is, operated in a mutual-capacitance mode, the controller 47 may provide suitable alternating signals 17, $V_{sig}(t)$ to each amplifier 52 of the first amplifier module 48a.

In this way, an input of each amplifier 52 of the first amplification module 48a may be used to drive the corresponding third electrode 27 of the first touch panel 43 using the alternating signal 17, $V_{sig}(t)$. Consequently, the input signals 10 received from a given third electrode 27 and first electrodes 7 intersecting the given third electrode 27 may be caused to vary in dependence upon a capacitive coupling between the electrodes 7, 27, a user's digit or stylus and the capacitance measurement signal, and the input signals concurrently vary in dependence upon a strain of the layer of piezoelectric material proximate to the given first electrode. In this way, the third electrodes 27 may be transmitting, or Tx, electrodes and the first electrodes 7 may be receiving, or Rx, electrodes. Based on the second filtered signals 16 obtained by the controller 47 in the digital domain, the controller 47 calculates capacitance values 21 corresponding to a mutual-capacitance between the addressed third electrode 27 and the addressed first electrode 7. The capacitance values 21 are output via the link 32.

Alternatively, alternating signals 17, $V_{sig}(t)$ may be provided to the second amplifier module 48b, the first electrodes 7 may be transmitting, or Tx, electrodes and the third electrodes 27 may be receiving, or Rx, electrodes.

The processor 33 of the electronic device 29 receives the pressure values 20a, 20b and capacitance values 21a, 21b, 21 and may use these to determine a location and an applied force corresponding to one or more user interactions with the first touch panel 43. Alternatively, the locations and applied forces corresponding to user interactions may be determined by the controller 47 and communicated to the processor 33 via the link 32.

The controller 47 and/or the processor 33 may be calibrated to convert the first filtered signals 15a, 15b into applied forces or pressures by applying known pressures to known locations so that the accuracy of calculated positions and/or pressures of one or more user interactions may be optimised and/or verified.

Another difference between the first touch panel system 42 and the touch panel systems described with reference to FIGS. 15 to 18, 21, and 25 to 29 of WO 2016/102975 A2, is that in the first touch panel system 42 of the present specification, the amplified signals 14a, 14b are multiplexed instead of the input signals 10. A consequence of providing a separate charge amplifier for each first and third electrode 7, 27 of the first touch panel 43 is that the size, complexity and cost of the first touch controller 44 is increased relative to the touch panel systems described with reference to FIGS. 15 to 18, 21, and 25 to 29 of WO 2016/102975 A2. It might be considered that it would make little difference whether signals are multiplexed before or after amplification, so that multiplexing before amplification would always be preferred due to the reduction in size, complexity and cost possible when fewer charge amplifiers are required.

However, in the specific application of combined pressure and capacitive sensing by separating a single amplified signal 14, it has been surprisingly realised that multiplexing the amplified signals 14 instead of the input signals 10 may provide improved performance. In particular, multiplexing the amplified signal 14 may improve the capture of charges induced in response to straining of the piezoelectric material layer 9 at times when a particular electrode 7, 27 is not being addressed. In other words, charges induced whilst other electrodes 7, 27 are being read out. When the input signals 10 are multiplexed, any charge induced on a non-addressed electrode will be stored on the input capacitance of the multiplexer. An input capacitance of a multiplexer is typically small, and may show variations between different inputs which may be significant in comparison to charges generated in response to straining of the piezoelectric material layer 9. By contrast, when the amplified signals 15 are multiplexed instead, charges induced when an electrode 7, 27 is not being addressed may be stored in a capacitance of an amplifier 52 feedback network (see FIG. 7), which may be both larger and more consistent. In this way, the first touch controller 44 may have improved accuracy in detecting the pressures of user interactions regardless of the timing of the user interaction with respect to a scanning/addressing sequence of the first and third electrodes 7, 27.

Additionally, multiplexing the amplified signals 14 instead of the input signals 10 may avoid problems with leakage current. In particular, the off state switches of a multiplexer will, in practice, leak small currents over time. These small leakage currents corresponding to all of the inputs not being addressed by a to may add up and be integrated by a charge amplifier, and the overall effect may be comparable to the charge or current corresponding to a user interaction proximate to an addressed electrode 7, 27. Such leakage currents may degrade the sensitivity to applied pressures, and may also limit scalability since a larger touch panel having a greater number of electrodes will need a correspondingly greater number of multiplexer channels, increasing the leakage current. By contrast, when multiplexing the amplified signals 14 the charge amplifiers 52 do not receive such residual currents.

In addition, it has been surprisingly realised that, in application to combined pressure and capacitance sensing based on separating a single signal, multiplexing the amplified signals 15 may allow each charge amplifier 52 to require a lower bandwidth and lower current capacity, as compared to the requirements for charge amplifiers when the input signals 10 are multiplexed.

Retaining multiplexing before processing by the ADCs 50, 51 permits the first touch controller 44 to still be smaller and less complex than providing a wholly separate channel for each first and third electrode 7, 27, since the ADCs 50, 51 do not need to be duplicated for each electrode 7, 27.

Modification using single ADC: Although the first touch panel system 42 has been described as including a primary ADC 50 to obtain the first filtered signal 15 and a secondary ADC 51 to obtain die digitised amplified signal 54, a modified first touch panel system (not shown) may be implemented using a single ADC (not shown) which is capable of alternating operation at the first and second sampling frequencies $f_{piezo}$, $f_{cap}$. For example, a single ADC (not shown) may be controlled by the synchronisation signal 33 to obtain the first filtered signal 15 for a period, then subsequently be switched to obtain the digitised amplified signal 54 for a period, before switching back to measure the first filtered signal 15 again. The single ADC may be connectable to any one of the first or third electrodes 7, 27 using a multiplexer or switching arrangement. In this way, a single ADC can be used, in combination with digital filtering in the controller 47, to obtain the first and second filtered signals 15, 16 from a given first/third electrode 7, 27 sequentially. However, the signals applied to the touch panel 43 and passing through the amplifier modules 48a, 48b and multiplexers 49a, 49b remain the same throughout, only the ADC sampling rate is varied. This may allow for sequential measurements of pressure and capacitance at a high rate and with minimal impact from the switching.

By contrast, if the actual signals applied to the touch panel 43 were to be switched, the switching rate would be limited by the inductance and capacitance of the touch panel 43, traces 45, amplifiers 52, and multiplexers 49a, 49b.

In this way, the implementation of sequential, alternating operation at the first and second sampling frequencies $f_{piezo}$, $f_{cap}$ reduces the number of ADCs required. Even though the single ADC (not shown) must be capable of operation up to the second sampling frequency $f_{cap}$, the power draw when sampling at the first sampling frequency $f_{piezo}$ may be relatively reduced.

Figure 7:
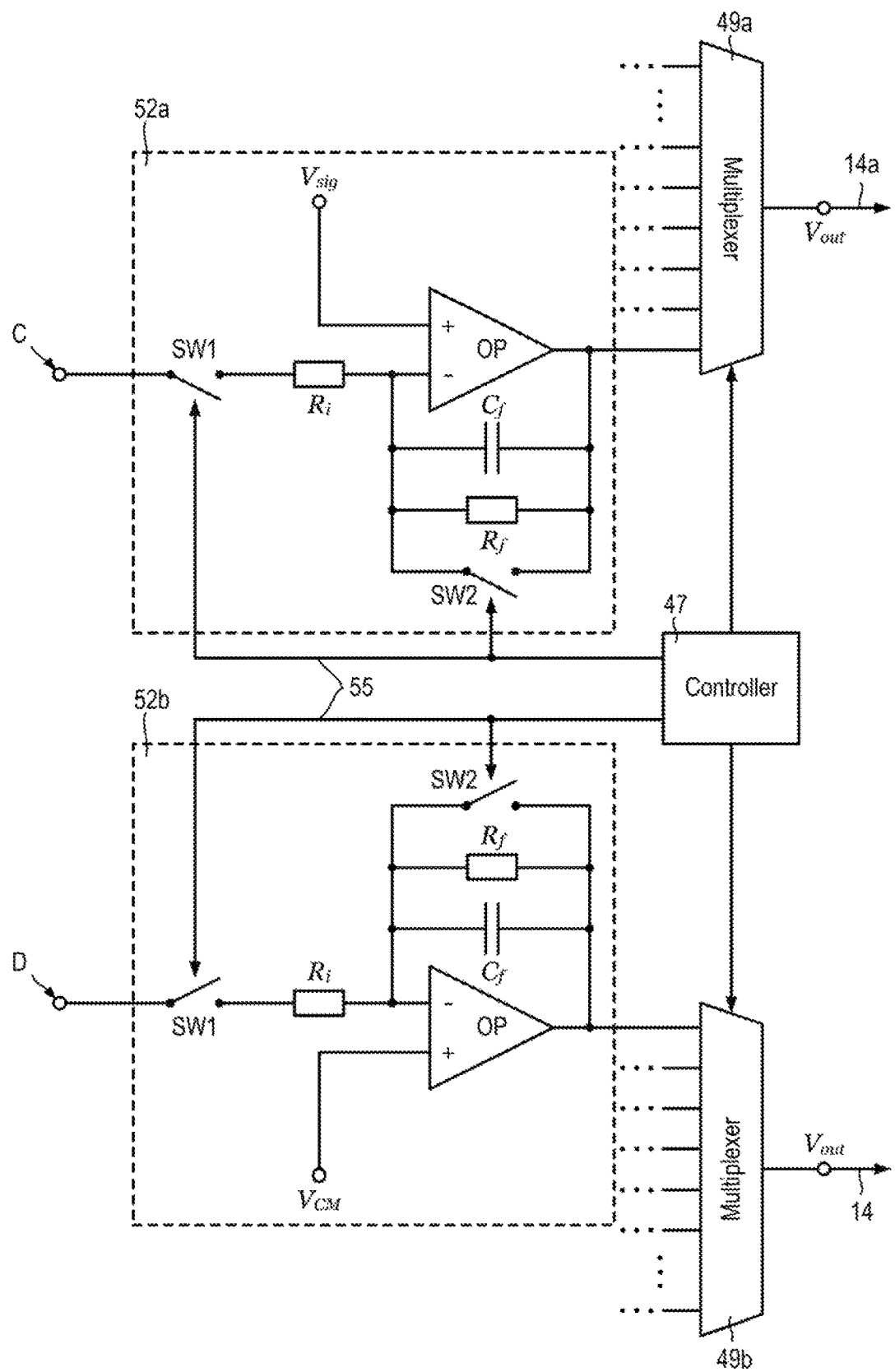
FIG. 7 is a circuit diagram for an example of charge amplifiers for use in the first touch panel system.

Example of charge amplifiers: Referring also to FIG. 7, an example of one configuration of charge amplifiers 52a, 52b suitable for use in the first and second amplifier modules 48a, 48b is shown.

In one configuration, each charge amplifier 52a, 52b includes an operational amplifier OP having an inverting input, a non-inverting input and an output. For example, each charge amplifier 52a forming part of the first amplifier module 48a includes an operational amplifier OP having an inverting input coupled to a corresponding terminal C an input resistance $R_i$ and a first switch SW1 connected in series. The non-inverting input of the operational amplifier OP is connected to an alternating signal 17, $V_{sig}(t)$. The alternating signal 17, $V_{sig}(t)$ may be provided by the controller 47, by a separate module of the first touch controller 44, or may be received into the first touch controller 44 from an external source. Since the inverting input will be at practically the same voltage as the non-inverting input, the non-inverting input can be caused to drive the corresponding third electrode 27. A feedback network of the charge amplifier 52a includes a feedback resistance $R_f$, a feedback capacitance $C_f$ and a second switch SW2 connected in parallel between the inverting input and the output of the operational amplifier OP. The output of the operational amplifier $V_{out}$ provides the amplified signal 14.

In the example shown in FIG. 7, the first touch controller 44 is, configured for mutual capacitance measurements between each pair of first and third electrodes 7, 27. Each charge amplifier 52b forming part of the second amplifier module 48b is the same as each charge amplifier 52a of the first amplifier module 48a, except that the non-inverting input of the operational amplifier OP is coupled to a common mode voltage $V_{CM}$ instead of the alternating signal 17, $V_{sig}(t)$, and in that the inverting input is connected to a terminal D instead of a terminal C.

Other terminals of the operational amplifiers OP, such as power supply terminals, may be present, but are not shown in this or other schematic circuit diagrams described herein.

The second switches SW2 permit the corresponding feedback capacitors $C_f$ to lie discharged. The opening and closing of the second switches SW2 may be governed by the second synchronisation signal 55 provided by the controller 47. In this way, the feedback capacitors $C_f$ of each charge amplifier 52a, 52b may be periodically discharged in order to reset the feedback network of the operational amplifier OP to prevent excessive drift. Similarly, the first switches SW1 may be controlled by the second synchronisation signal 55 provided by the controller 47 to enable an amplifier 52a. 52b to be connected or disconnected from the corresponding electrode 7, 27 if required.

Figure 8:
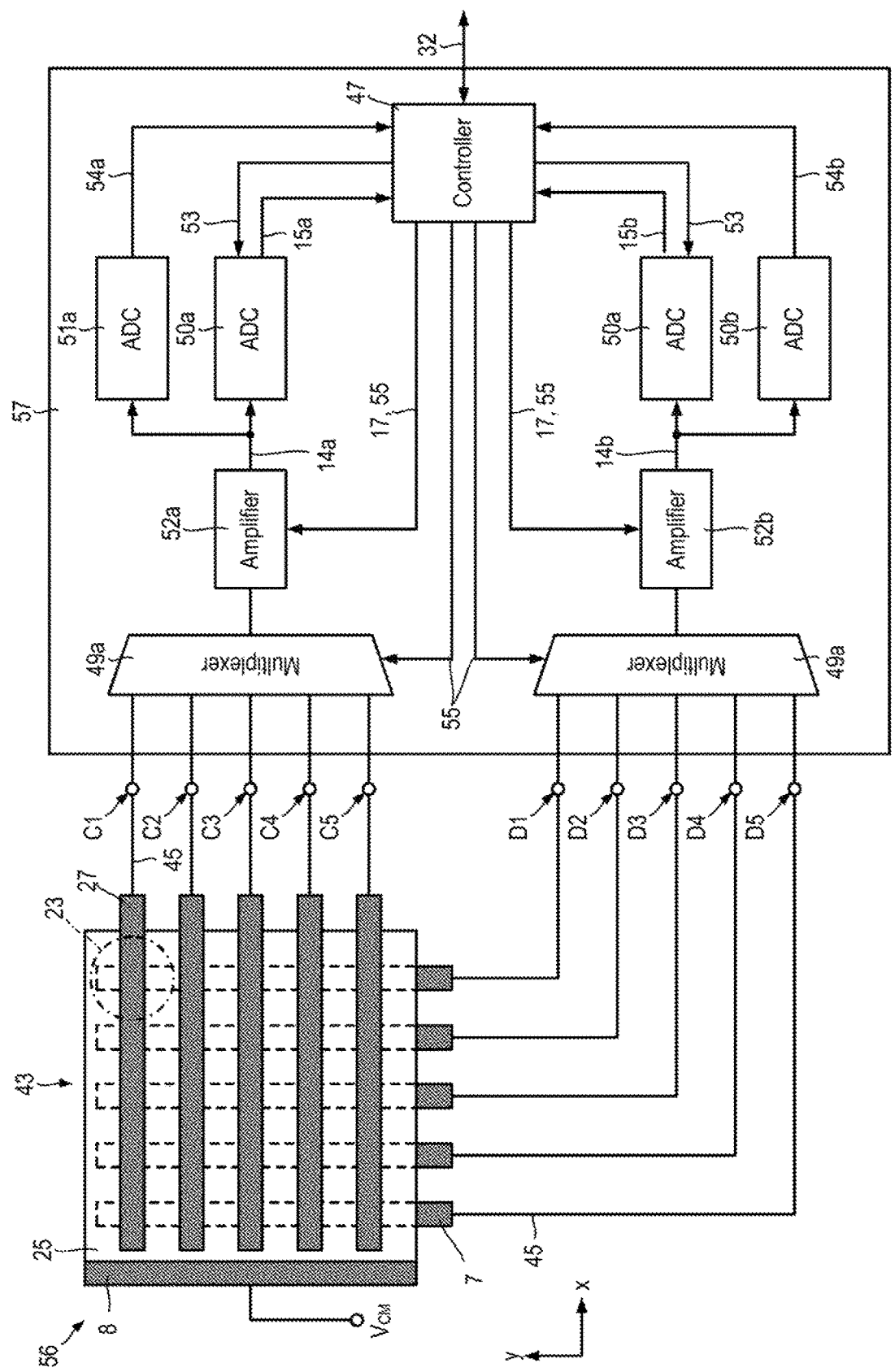
FIG. 8 illustrates a second touch panel system.

Second touch panel system: Referring also to FIG. 8, a second touch panel system 56 includes the first touch panel 43 and a second touch controller 57 for combined pressure and capacitance sensing.

The second touch controller 57 is the same as the first touch controller 44, except that in the second touch controller 57 the input signals 10 from a third electrode 27 are connected to a single charge amplifier 52a by a first multiplexer 49a. The charge amplifier 52a outputs the amplified signal 14a, which is processed by the primary ADC 50a, the secondary ADC 51a and the controller 47 to obtain the first and second filtered signals 15, 16 in the same way as for the first touch controller 44. Similarly, the input signals 10 from a first electrode 7 are connected to a single charge amplifier 52b by a second multiplexer 49b. The charge amplifier 52b outputs the amplified signal 14b, which is processed by the primary ADC 50b, the secondary ADC 51b and the controller 47 to obtain the first and second filtered signals 15, 16 in the same way as for the first touch controller 44.

In the same way as the first touch controller 44, use of primary and secondary ADCs 50, 51 is not essential. Instead, a single ADC (not shown) which is capable of alternating operation at the first and second sampling frequencies $f_{piezo}$, $f_{cap}$, so as to obtain the first and second filtered signals 15, 16 sequentially.

Figure 9:
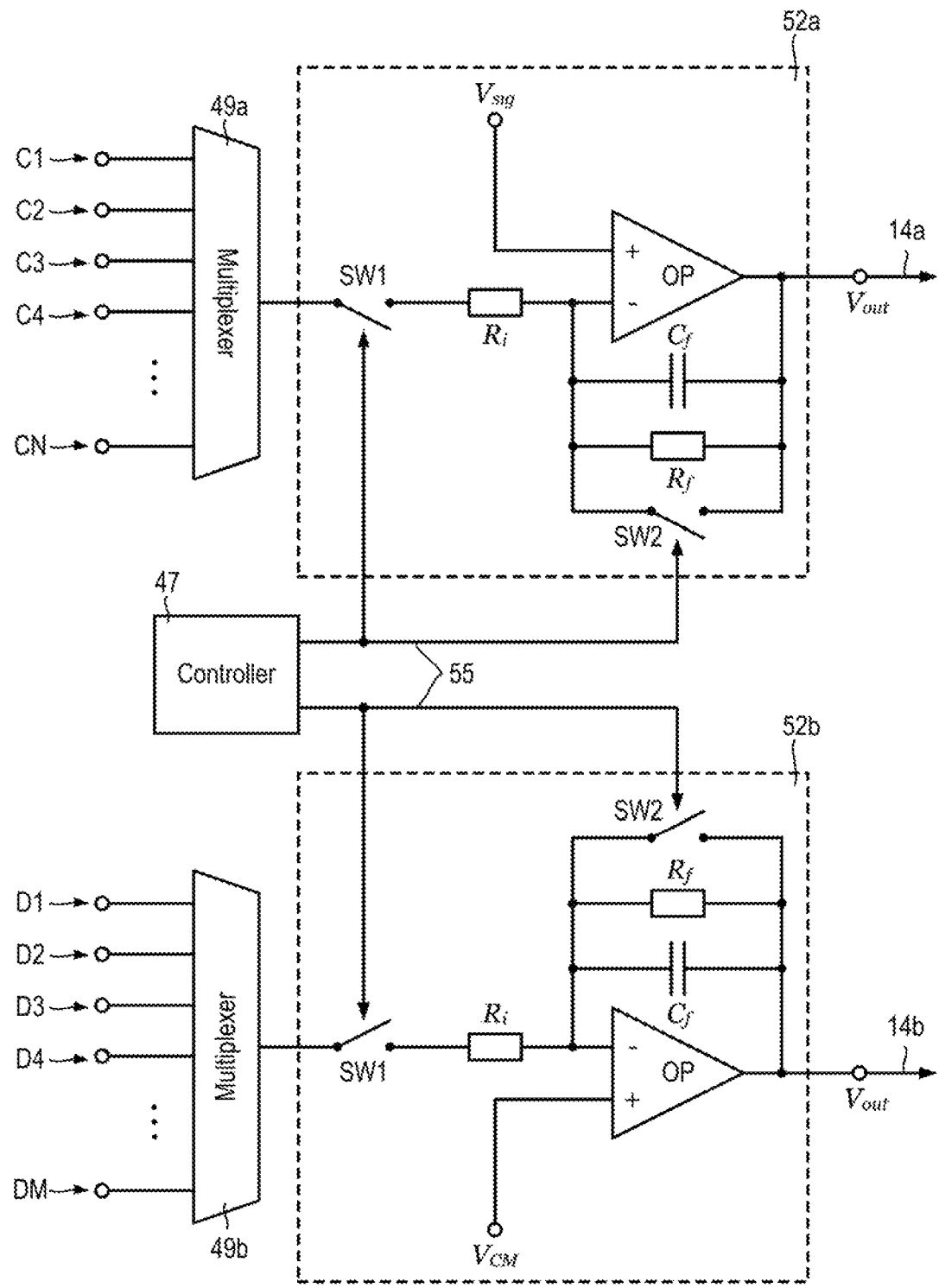
FIG. 9 is a circuit diagram for art example of charge amplifiers for use in the second touch panel system.

Example of charge amplifiers: Referring also to FIG. 9, an example of one configuration of charge amplifiers 52a, 52b for tire second touch controller 57 is shown.

The charge amplifiers 52a, 52b of the second touch controller 57 may be configured in the same way as the charge amplifiers 52a, 52b of the amplifier modules 48a, 48b of the first touch controller 44, except that the inverting input of the operational amplifiers OP are coupled to the corresponding outputs of the multiplexers 49a, 49b via respective input resistances $R_1$. Each input of the first multiplexer 49a is coupled to one of a number, N, of input terminals C1, C2, ..., CN. Each input of the second multiplexer 49b is coupled to one of a number, M, of input terminals D1, D2, ..., DM.

Figure 10:
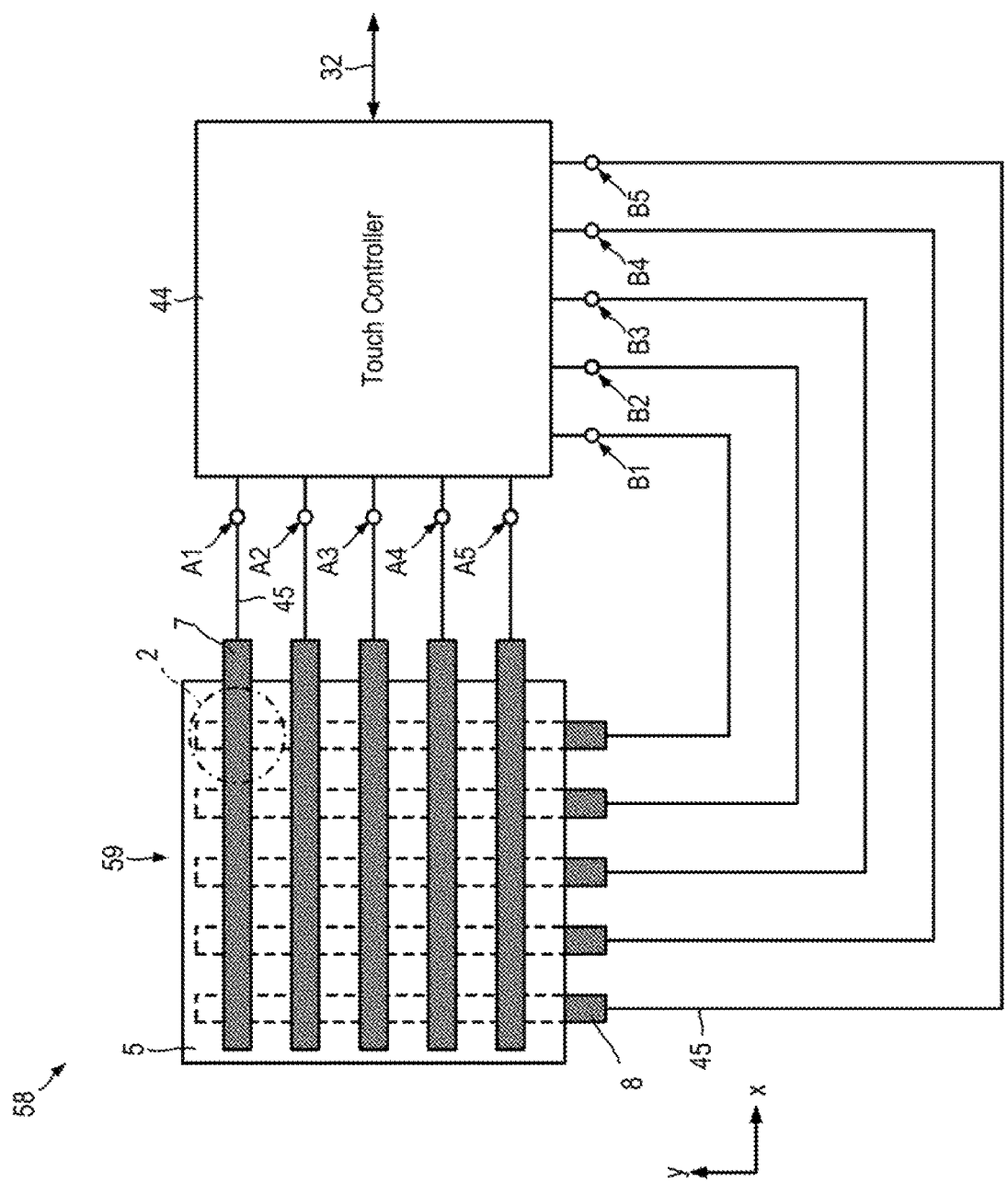
FIG. 10 illustrates a third touch panel system.

Third touch panel system. Referring also to FIG. 10, a third touch panel system 58 includes a second touch panel 59 and the first touch controller 44 for combined pressure and capacitance sensing.

The second touch panel. 59 includes a layer structure 4 which is generally the same as the first layer structures 4 of the first touch sensor 2, except that multiple first electrodes 7 are disposed on the first face 5 of the first layer structure 4 and that multiple second electrodes 8 are disposed on the second face 6 of the first layer structure 4.

The first electrodes 7 each extend in the first direction x and the first electrodes 7 are disposed in an array evenly spaced in the second direction y. The second electrodes 8 each extend in the second direction y and the second electrodes 8 are disposed in an array evenly spaced in the first direction x. Each first electrode 7 and each second electrode 8 is coupled to a corresponding conductive trace 45.

In this way, the area around each intersection of a first electrode 7 with a second electrode 8 effectively provides a first touch sensor 2.

The second touch panel 59 may be bonded overlying the display 38 of an electronic device 29. In this case, the materials of the second touch panel 59 should be substantially transparent as described hereinbefore. A cover lens 46 (FIG. 20) may be bonded overlying the second touch panel 59. The cover lens 46 (FIG. 20) is preferably glass but may be any transparent material. The cover lens 46 (FIG. 20) may be bonded to the second touch panel 59 using a layer of pressure sensitive adhesive (PSA) material (not shown). The layer of PSA material (not shown) may be substantially transparent. The first and second electrodes 7, 8 may be fabricated using index matching techniques to minimise visibility to a user.

Each first electrode 7 is connected to the input of a corresponding charge amplifier 52a of the first amplification module 48a of the first touch controller 44 via a respective terminal A1, A2, ..., A5. Similarly, each second electrode 8 is connected to the input of a corresponding charge amplifier 52b of the second amplification module 48b of the first touch controller 14 via a respective terminal B1, B2, ..., B5.

Fourth touch panel system: A fourth touch panel system (not shown) includes the second touch panel 59 connected to the second touch controller 57 for combined pressure and capacitance sensing.

Alternative electrode, geometries: In the first touch panel 43, the first and third electrodes 7, 27 have been shown in the form of elongated rectangular electrodes. However, other shapes may be used.

Figure 11:
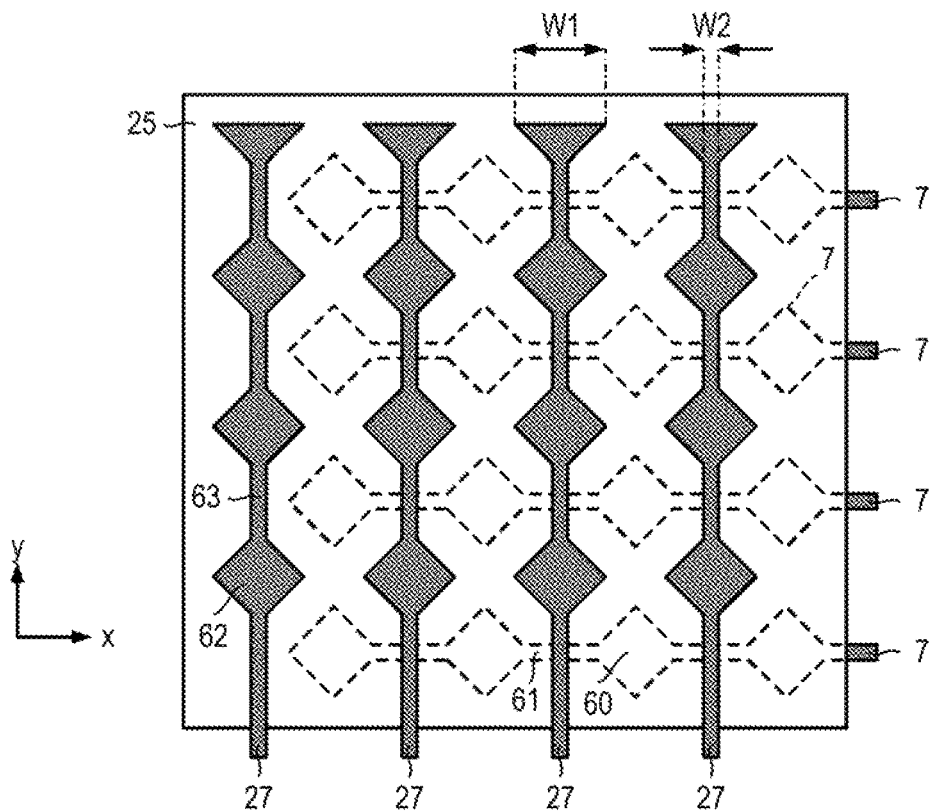
FIG. 11 is a plan view of an alternative electrode layout.

Referring also to FIG. 11, an alternative geometry of the first and third electrodes 7, 37 is shown.

Instead of being rectangular, each first electrode 7 may include several pad segments 60 evenly spaced in the first direction x and connected to one another in the first direction x by relatively narrow bridging segments 61. Similarly each third electrode 27 may comprise several pad segments 62 evenly spaced in the second direction y and connected to one another in the second direction y by relatively narrow bridging segments 63. The pad segments 60 of the first electrodes 7 are diamonds having a first width W1 in the second direction y and the bridging segments 61 of the first electrodes 7 have a second width W2 in the second, direction y. The pad segments 62 and bridging segments 63 of the third electrodes 27 have the same respective shapes and widths W1, W2 as, the first electrodes 7.

The first electrodes 7 and the third electrodes 27 are arranged such that the bridging segments 63 of the third electrodes 27 overlie the bridging segments 61 of the first electrodes 7. Alternatively, the first electrodes 7 and the third electrodes 27 may be arranged such that the pad segments 62 of the third electrodes 27 overlie the pad segments 60 of the first electrodes 7. The pad segments 60, 62 need not be diamond shaped, and may instead be circular. The pad segments 60, 62 may be a regular polygon such as a triangle, square, pentagon or hexagon. The pad segments 60, 62 may be I shaped or Z shaped.

The alternative geometries of first and third electrodes 7, 27 of the first touch panel 43 are equally applicable to the first and second electrodes 7, 8 of the second touch panel 59.

Figure 12:
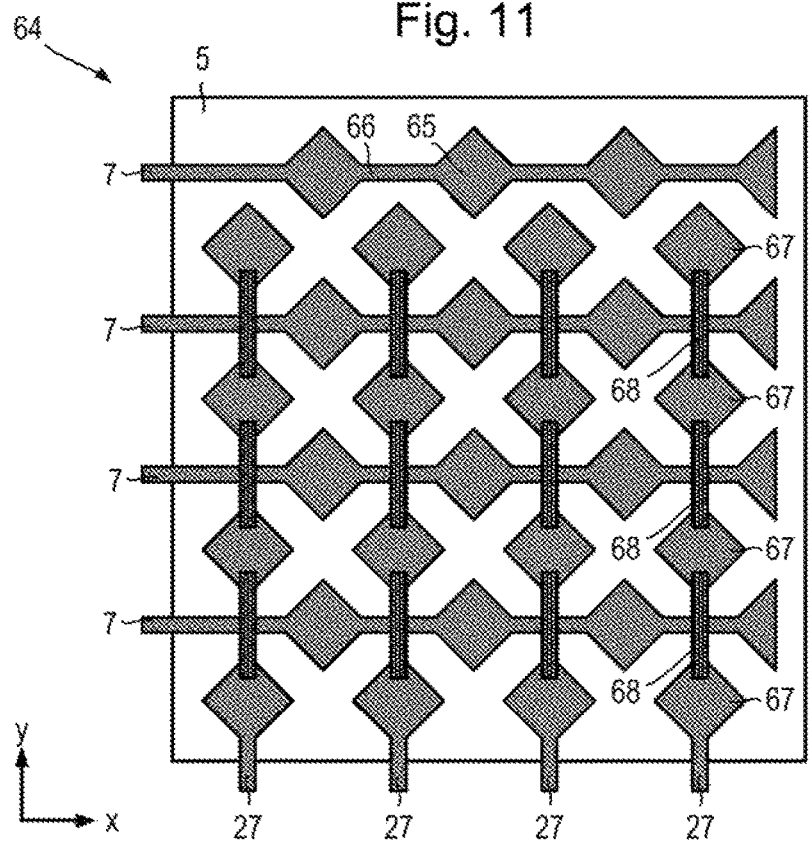
FIG. 12 is a plan view of a third touch panel.

Third touch panel: Referring also FIG. 12, a third touch panel 64 may be included in the first or second touch panel system 42, 56 instead of the first touch panel 43.

The third touch panel 64 is substantially the same as the first touch panel 43 except that the third touch panel 64 does not include the second layer structure 24 and the third, electrodes 27 are disposed on the first face 5 of the first layer structure 4 in addition to the first electrodes 7. Each first electrode 7 is a continuous conductive region extending in the first direction x. For example, each first electrode 7 may include several pad segments 65 evenly spaced in the first direction x and connected to one another in the first direction x by relatively narrow bridging segments 66. Each third electrode 27 may comprise several pad segments 67 evenly spaced in the second direction y. However, the pad segments 67 of the third electrodes 27 are disposed on the first face 5 of the first layer structure 4 and are interspersed with, and separated by, the first electrodes 7. The pad segments 67 corresponding to each third electrode 27 are connected together by conductive jumpers 68. The jumpers 68 each span a part of a first electrode 7 and the jumpers 68 are insulated from the first electrodes 7 by a thin layer of dielectric material (not shown) which may be localised to the area around the intersection of the jumper 68 and the first electrode 7.

Alternatively, a dielectric layer (not shown) may overlie the first face 5 of the first layer structure 4 and the first and third electrodes 7, 27. Conductive traces (not shown) extending in the second direction y may be disposed over the dielectric layer (not shown), each conductive trace (not shown) overlying the pad segments 67 making up one third electrode 27. The overlying conductive traces (not shown) may connect the pad segments 67 making up each third electrode 27 using vias (not shown) formed through the dielectric layer (not shown).

Figure 13:
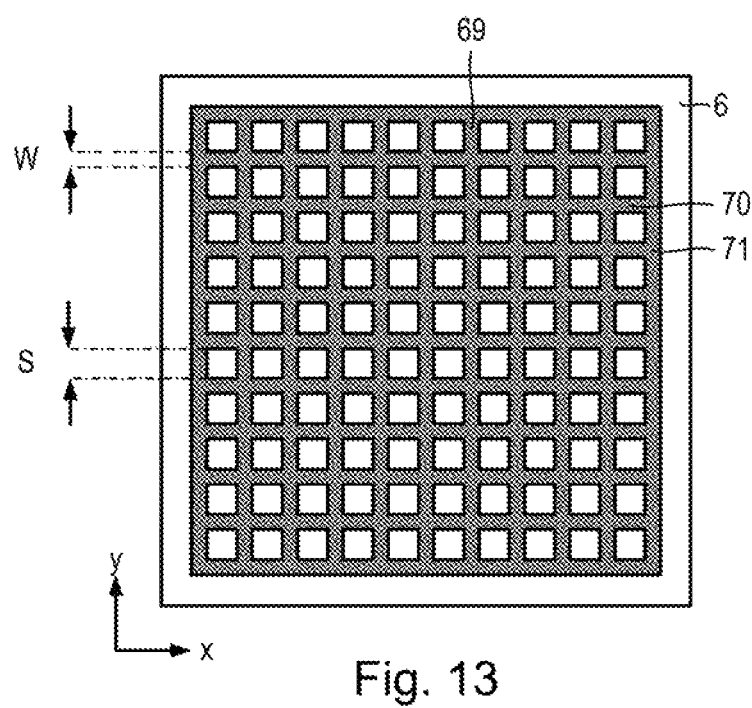
FIG. 13 is a plan view of a patterned electrode.

Patterned second electrode: Referring also to FIG. 13, a patterned second electrode 69 is in the form of a Cartesian grid. The conductive region of the patterned second electrode 69 includes struts 70 extending in the first direction x and having, a width W in the second direction y, and struts 71 extending in the second direction y and having a width W in the first direction x. The struts 70 extending in the first direction x are evenly spaced in the second direction y with a spacing S, and the struts 71 extending in the second direction y are evenly spaced in the first direction x with the same spacing S. The struts 70, 71 are joined where they intersect such that the patterned second electrode 69 is formed of a single region of conductive material.

The patterned second electrode 69 may be arranged such that the magnitude of a mutual capacitance between the first electrode 7 and the second electrode 8 is reduced in the first touch panel 43. This may increase the relative size of changes in the mutual capacitance between the first electrode 7 and the second electrode 8 resulting from a users touch, making such changes easier to detect.

Additionally or alternatively, the patterned second electrode 69 may be placed between the first and/or third electrodes 7, 27 and a user's digit or stylus without entirely screening the first and/or third electrodes 7, 27 from electrostatic interactions with the user's digit or stylus.

Figure 14:
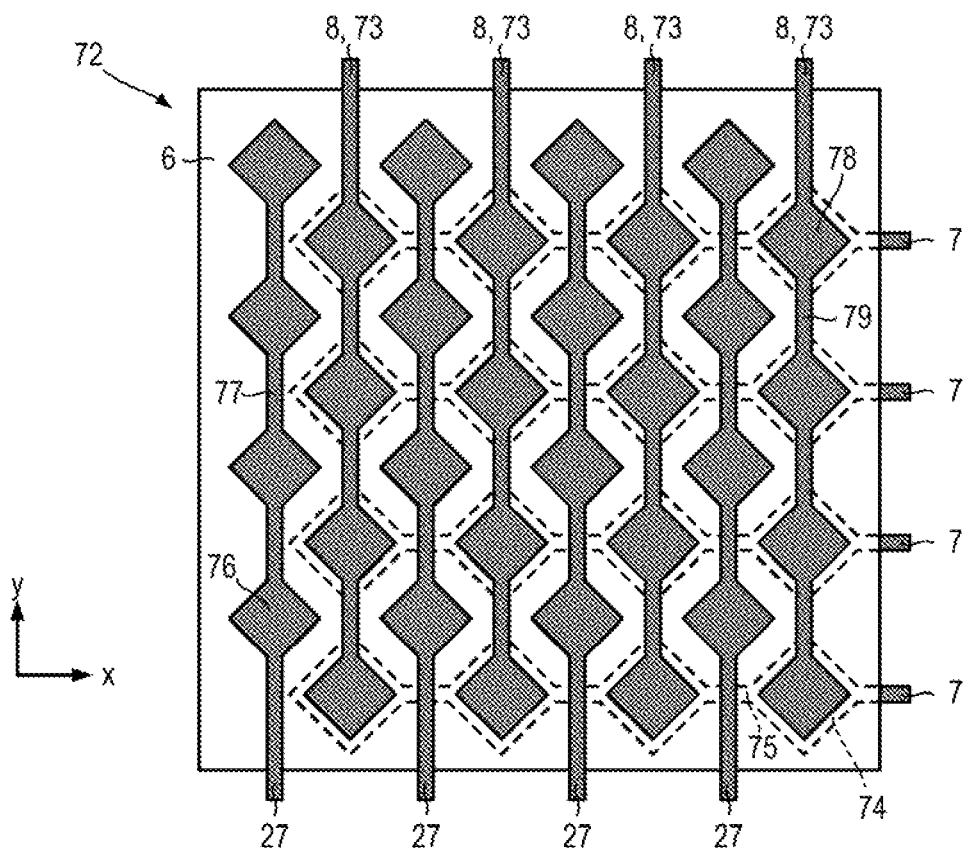
FIG. 14 is a plan view of a fourth touch panel.
Figure 15:
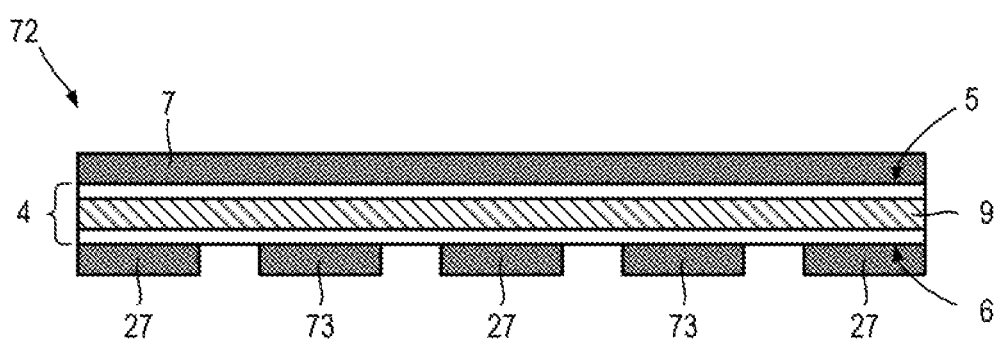
FIG. 15 is a cross-sectional view of a fourth touch panel.

Fourth touch panel: Referring also to FIGS. 14 and 15, a fourth touch panel 72 is shown.

The fourth touch panel 72 includes the first layer 4, a plurality of first electrodes 7 disposed on the first face 5 of the first layer structure 4, a plurality of third electrodes 27 disposed on the second face 6 of the first layer structure 4 and a plurality of second electrodes 8 disposed on the second face 6 of the layer structure 4 in the form of a plurality of separated second electrodes 73.

The first electrodes 7 extend in the tint direction x and are spaced apart in the second direction y. The third electrodes 27 extend in the second direction y and are spaced apart in the first direction x. The separated second electrodes 73 extend, in the second direction y are spaced apart in the first direction x. The separated second electrodes 73 and the third electrodes 27 are interleaved and do not contact one another. The separated second electrodes 73 and the third electrodes 27 could also be described as interdigitated. The separated second electrodes 73 and third electrodes 27 may be read using conductive traces (not shown) which exit the fourth touch panel 72 on different edges. Each first electrode 7 may take the form of several pad segments 74 evenly spaced in the first direction x and connected to one another in the first direction by relatively narrow bridging segments 75. Similarly, each third electrode 27 may include several pad segments 76 evenly spaced in the second direction y and connected to one another in the second direction y by relatively narrow bridging segments 77. The pad segments 74 of the first electrodes 7 may be diamond shaped. The pad segments 76 and bridging segments 77 of the third electrodes 27 may have the same respective shapes and widths as the first electrodes 7. Each separated second electrode 73 may include several pad segments 78 evenly spaced in the second direction y and connected to one another in the second direction y by relatively narrow bridging segments 79. The pad segments 78 and bridging segments 79 of the separated second electrodes 73 may have the same respective shapes and widths as the first and third electrodes 7, 27. Alternatively, the pad segments 74 of the first electrodes 7 may be larger or smaller than the pad segments 78 of the separated second electrodes 72.

The first electrodes 7 and the third electrodes 27 are arranged such that the bridging segments 77 of the third electrodes 27 overlie the bridging segments 75 of the first electrodes 7. The first electrodes. 7 and the third electrodes 27 are arranged such that the respective pad segments 74, 76 do not overlap instead, the separated second electrodes 73 are arranged such that the pad segments 78 of the separated second electrodes 73 overlap the pad segments 74 of the first electrodes 7. The pad segments 74, 76, 78 need not be diamond shaped, and may instead be circular. The pad segments 74, 76, 78 may be a regular polygonal shape such as a triangle, square, pentagon or hexagon.

The fourth touch panel 72 may be used in, for example the first or second touch panel systems 42, 56 to measure mutual capacitance between a pair of first and third electrodes 7, 27. The separated second electrodes 73 may be coupled to each another, far example using external traces (not shown) and addressed collectively to measure pressure values between a first electrode 7 and the separated second electrodes 73 and/or between a third electrode 27 and the separated second electrodes 73. Alternatively, the separated second electrodes 72 may be individually addressable to measure pressure values using a pair of first and separated second electrodes 7, 73 and/or a pair of third and separated second electrode 27, 73.

Pre-amplification signal separation: In the first and second touch panel systems 42, 56, a single input signal 10 including both pressure and capacitance information is received from an electrode 7, 8, 27, before being amplified to generate an amplified signal 14 which is subsequently processed to obtain a first filtered signal 15 containing pressure information and a second filtered signal 16 containing capacitance information.

In an alternative approach to combined pressure and capacitance sensing, a single input signal 10 including pressure and capacitance information may be separated into pressure and capacitance processing channels before amplification. Touch panel systems employing post separation amplification can also benefit from many of the improvements provided by multiplexing amplified signals from a plurality of amplifiers.

Figure 16:
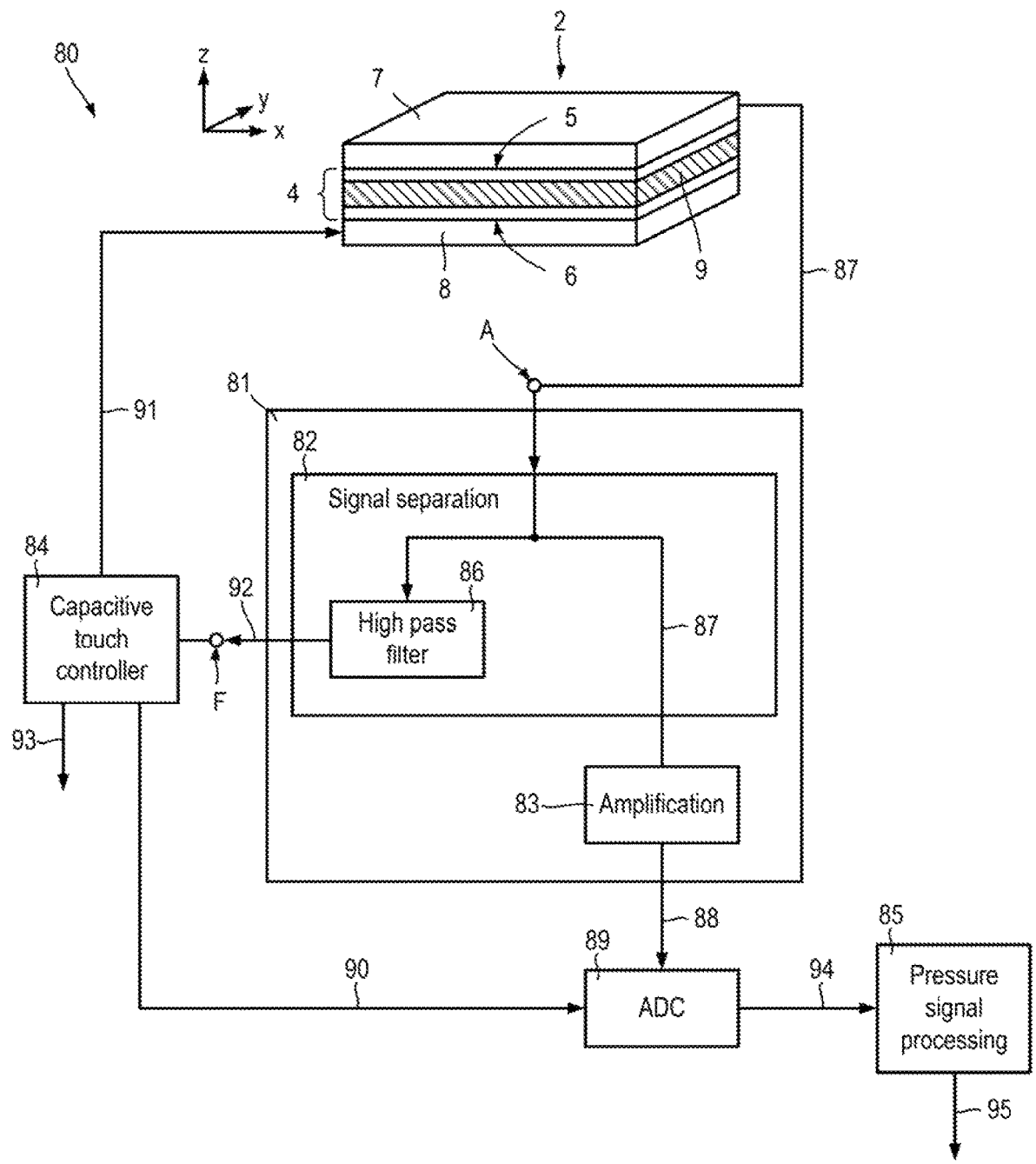
FIG. 16 illustrates a third apparatus for combined capacitive and pressure sensing.

Referring also to FIG. 16, a third apparatus 80 for combined pressure and capacitance sensing is shown.

The third apparatus 80 includes a first touch sensor 2 and an alternative front end module 81. The alternative front end module 81 includes a signal separation stage 82 and an amplification stage 83. The alternative front end module 81 is connected to the touch sensor 2, a capacitive touch controller 84 and a pressure signal processing module 85. The alternative front end module 81 allows capacitance and pressure measurements, to be made from the first touch sensor 2 concurrently using one pair of electrodes 7, 8.

The alternative front end module 81 includes a tint input/output terminal A for connecting to the touch sensor 2 and a second input/output terminal F for connecting to the capacitive touch controller 84. The signal separation stage 82 includes a high-pass filter 86. The signal separation stage 82 connects the first input/output terminal A to the second input/output terminal F via the high-pass filter 86. The high-pass filter 86 filters signals between the second input/output terminal F and the first input/output terminal A. The signal separation stage 82 also connects the amplification stage 83 to the first input/output terminal A. Signals between the first input/output terminal A and the amplification stage 83 are not filtered by the high-pass filter 86.

The amplification stage 83 is connected to the first input/output terminal A through the signal separation stage 82. The amplification stage 83 includes an amplifier having characteristics of a low-pass filter, for example, an operational amplifier and a resistance-capacitance feedback network. The amplification stage 83 receives an input signal 87 from an electrode 7 of the touch sensor 2, and high-frequency components above a band-stop frequency of the amplification stage are rejected, or at least attenuated, whereas frequency components below the hand-stop frequency, including the integrated output voltage signal $V_{piezo}(t)$, are amplified to produce an amplified signal 88. The rejection of high frequency components by the amplification stage 83 input is, in practice, imperfect, with the result that the amplified signal 88 may still include significant unwanted contributions from the capacitance measurements. Consequently, further filtering of the amplified signal 88 in the digital domain could be employed to reduce interference from capacitance measurements. However, this may increase computational requirements for the pressure signal processing module 85.

In the same way as for the first to fourth touch panel systems 42, 56, 58, the amplified signal 88 may be sampled whilst reducing or avoiding interference from capacitance measurements by sampling the amplified signal 88 at the first sampling frequency $f_{piezo}$ using an ADC 89 which is synchronised with the capacitance measurements using a synchronisation/clock signal 90 supplied by the capacitive touch controller 84. For example, the synchronisation signal 90 may be a clocking signal of the capacitive touch controller 84 or may be the actual driving signal for capacitance measurements. The ADC 89 outputs the filtered amplified signal 94 to the pressure signal processing module 85.

Alternatively, the pressure signal processing module 85, or even a separate synchronisation module (not shown) may receive a clocking signal of the capacitive touch controller 84, or the actual driving signal for capacitance measurements and, based on these inputs, generate the synchronisation signal 90 for the ADC 89.

The amplification stage 83 may have a low-frequency cut-off configured to reject a pyroelectric response of the layer of piezoelectric material 9. The low frequency cut-off may take a value between 1 Hz and 7 Hz. The amplification stage 83 may include a notch filter configured to reject a mains power distribution frequency, for example, 50 Hz or 60 Hz. Alternatively, the mains power notch filter may be a separate filter stage (not shown) disposed before or after the amplification stage 83.

The capacitive touch controller 84 is, in general, a conventional capacitive touch controller capable of measuring the self-capacitance or mutual capacitance of a projected capacitance touch panel electrode. For example, the capacitive touch controller may be a commercially available touch controller such as an Atmel® MXT224 touch controller. For example, for a mutual capacitance measurement, the capacitive touch controller 84 outputs a capacitance measurement drive signal 91 which drives the second electrode 8 as a transmitting or Tx electrode. The first electrode 7 serves as a receiving or Rx electrode and picks up a received signal 92 based on the drive signal 91 and a mutual capacitance between the first and second electrodes 7, 8. The drive and received signals 91, 92 typically have the same frequency contents. The high-pass filter 86 has a frequency response which passes the drive/received signals 91, 92, which are typically at least 10 kHz, without attenuation or with minimal attenuation. Based on the transmitted drive signal 91 and the received signal 92, the capacitive touch controller 84 calculates a mutual capacitance value and provides an output comprising capacitance values 93.

The specific method and the specific waveforms of the capacitance measurement drive signals 91 depend on the particular capacitive touch controller 84 used. However, any capacitive touch controller 84 may be used with the alternative front end module 81 by adjusting the lower hand-stop frequency of the high-pass filter 86 to pass the capacitance measurement drive signals 91 produced by a particular capacitive touch controller 84 and picked up as received signal 92.

The input signal 87 may differ slightly from the received signal in response to a user interaction with the first touch sensor 2, or with a layer of material overlying the first touch sensor 2, which in either case might produce a piezoelectric response from the layer of piezoelectric material 9. In this way, the input signal 87 is approximately a superposition of a received signal 92 and a piezoelectric response $I_{piezo}(t)$.

Because the high-pass filter 86 is adapted to pass the received signal 92, the capacitive touch controller 84 may communicate with the touch sensor 2 and receive the received signal 92 with no, or minimal, interference from the piezoelectric response $I_{piezo}(t)$. In this way, a capacitive touch controller 84 suitable for use with a conventional projected capacitance touch panel can be used with the alternative front end module 81.

The amplification stage 83 is adapted to reject, or at least attenuate, the received signals 92, in this way, the amplified signal 88 may be substantially based on an integrated output voltage signal $V_{piezo}(t)$ corresponding to the piezoelectric response $I_{piezo}(t)$ produced by straining the layer of piezoelectric material 9. As explained hereinbefore, the synchronisation of the ADC 89 may further reduce any residual components of the received signals 92 in the filtered amplified signal 94. In this way, the amplitude of the filtered amplified signal 94 is dependent upon a pressure applied to the first touch sensor 2.

The separation of the received signals 92 and the piezoelectric response $I_{piezo}(t)$ is possible because, as described hereinbefore, these signals have dissimilar and generally separable frequency bandwidths.

The pressure signal processing module 85 receives the filtered amplified signals 94, determines pressure values 95, and provides the pressure values 95 as an output. The pressure signal processing module 85 may determine the pressure value 95 corresponding to a given filtered amplified signal 94 using, for example, a pre calibrated empirical relationship, or by interpolation of a pre-calibrated look-up table.

In this way, the third apparatus 80 may be used for combined pressure and capacitance sensing, although in a different way to the first or second apparatus 1, 22 or first or second touch panel systems 42, 56. Compared to the first or second apparatus 1, 23 or first or second touch panel systems 42, 56, the third apparatus 80 allows the separation and amplification of pressure and capacitance signals in a way which may be readily integrated with existing projected capacitance touch panels and capacitive touch controllers 84.

Alternatively, the third apparatus 80 may be used with a capacitive touch controller 84 which measures self-capacitance, in which case the self-capacitance measurement signal (not shown) would be provided to the first electrode 7 via the signal separation stage 82 and high-pass filter 86. In this case, the capacitive touch controller 84 may also output a biasing signal to the second electrode 8 to screen out the mutual capacitance between the first and second electrodes 7, 8.

The third apparatus 80 may also be used with the second touch sensor 23, for example a third apparatus 80 may be connected to each of the first and third electrodes 7, 27.

Fifth touch panel system: Touch panel systems including touch panels including multiple touch sensors 2, 23 combined with apparatus for combined capacitance and pressure sensing employing pre-amplification signal separation have been described in GB 2544353 A, in particular with reference to FIGS. 5, 10 to 12, 15 and 19 to 23 of this document. Touch panel systems described in GB 2544353 A implement isolation of the piezoelectric response using hardware filters or software filtering in the digital domain. Thus, by using the approach of the present specification and employing an ADC 89 synchronised to low or zero signal level of capacitance measurement signals, touch panel systems of the present invention may obtain the advantages described hereinbefore in relation to the first touch panel system 42.

Further, in the touch panel systems described in GB 2544353 A, an amplifier was provided corresponding to each electrode, or several electrodes were connected to a smaller number of amplifiers by an impedance network to produce aggregated pressure signals.

The multiplexing of amplified signals, described in relation to the first and second touch panel systems 42, 56 may also be employed in the context of pre-amplification signal separation and may obtain many of the same effects. In particular, multiplexing of amplified signals allows a reduction in the number of ADCs required.

Figure 17:
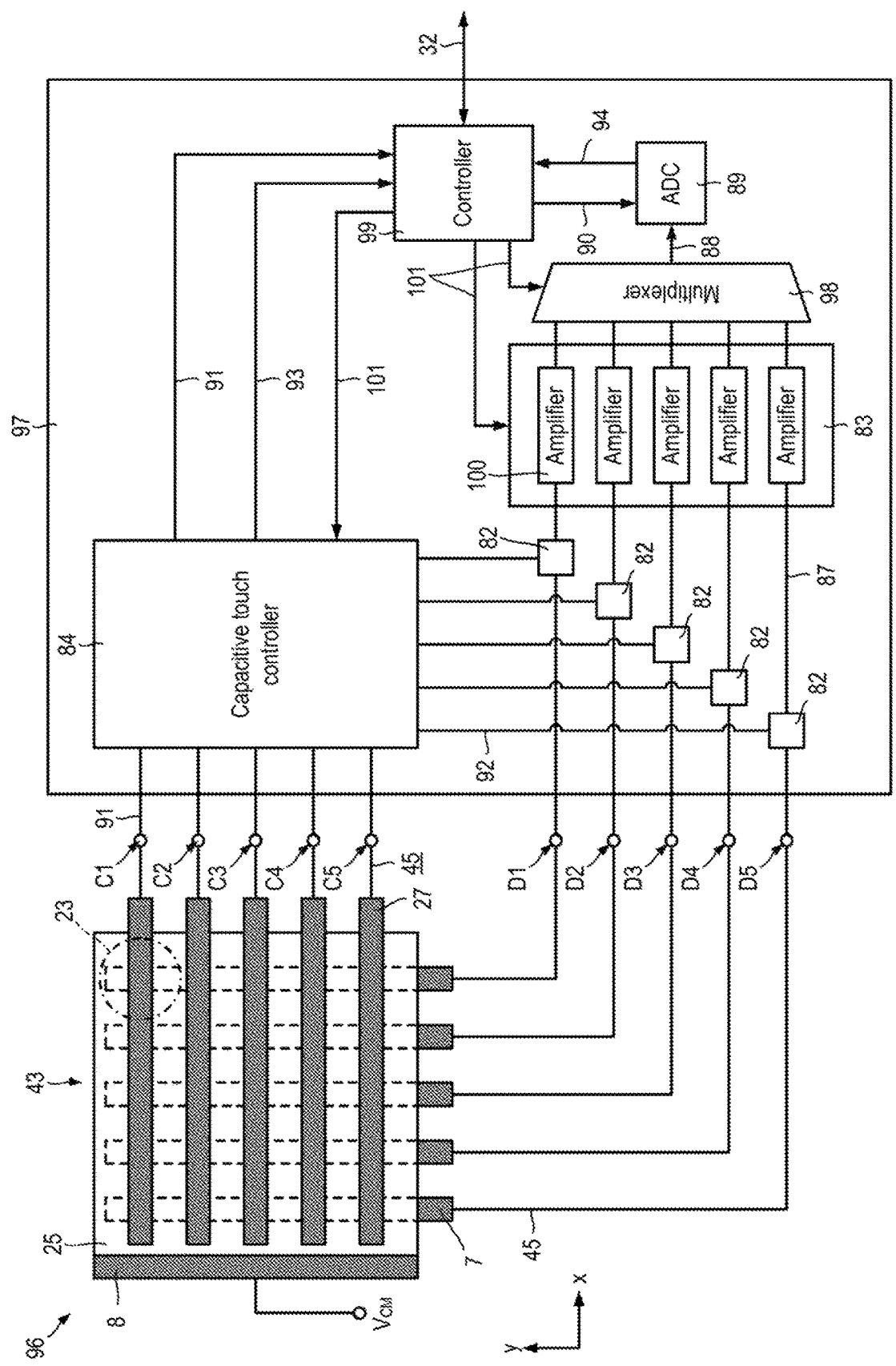
FIG. 17 illustrates a fifth touch panel system.

Referring also to FIG. 17, a fifth touch panel system 96 includes the first touch panel 43 and a third touch controller 97 for combined pressure and capacitance sensing.

The first touch panel 43 may be bonded overlying the display 38 of an electronic device 29. In this case, the materials of the first touch panel 43 should be substantially transparent as described hereinbefore. A cover lens 46 (FIG. 21) may be bonded over the first touch panel 43. The cover lens 46 (FIG. 21) is preferably glass but may be any transparent material. The cover lens 46 (FIG. 21) may be bonded to the first touch panel 43 using a layer of pressure sensitive adhesive (PSA) material 109 (FIG. 22). The layer of PSA material 109 (FIG. 22) may be substantially transparent. The first and third electrodes 7, 27 may be fabricated using index matching techniques to minimise visibility to a user.

The third touch controller 97 includes a capacitive touch controller 84, a number of signal separation stages 82, an amplification stage 83, a multiplexer 98, an ADC 89 and a controller 99. The controller 99 may communicate with the processor 33 of the electronic device 29 using a link 32.

Each separation stage 82 includes a high-pass filter 86. The amplification stage 83 includes a number of charge amplifiers 100. Each amplifier 100 is configured to reject, or at least attenuate, the received signals 92. Each charge amplifier 100 of the amplification stage 83 is connected to a corresponding first electrode 7 via a respective terminal D1, . . . , D5 and conductive trace 45. The outputs of the charge amplifiers 100 of the amplification stage 83 are each connected to a corresponding input of the multiplexer 98. In this way, the multiplexer 98 may output an amplified signal 88 corresponding to an addressed first electrode 7. The amplified signal 88 is converted into a filtered amplified signal 94 by the ADC 89 by sampling during low or zero periods of the capacitance drive signal 91. In the third touch controller 97, the capacitive touch controller 84 provides the drive signal 91 to the controller 99, and based on the drive signal 91 the controller 99 provides the synchronisation signal 90 to the ADC 89. In the third touch controller 97, the controller 99 provides the functions of the pressure signal processing module 85. The ADC 89 may be integrated with the controller 99. The controller 99 determines pressure values 95 and outputs the pressure values 95 via the link 32.

The capacitive touch controller 84 is connected to each third electrode 27 via a respective terminal C1, . . . , C5 to supply capacitance measurement driving signals 91 to the third electrodes 27. In the example shown in FIG. 17, the third electrodes 27 serve as transmitting, Tx, electrodes and the first electrodes 7 serve as receiving, Rx, electrodes for mutual capacitance measurements. If the capacitive touch controller 84 has fewer driving outputs than there are third electrodes 27, a further multiplexer (not shown) may be included to enable driving of each third electrode 27. The capacitive touch controller 84 may output capacitance values 93 to the controller 99 for output via the link 32, or may have direct access to the link 32 for outputting capacitance values 93.

The controller 99 may provide a second synchronisation signal 101 to the multiplexer 98 and/or amplifiers 100. The second synchronisation signal 101 may cause the multiplexer 98 to address each first electrode 7 according to a sequence determined by the controller 99. The controller 99 may also provide the second synchronisation signal 101 to the capacitive touch controller 84 to cause the capacitive touch controller 84 to drive each third electrode 27 according to a sequence determined by the controller 99. In this way, the third touch controller 97 may obtain pressure and capacitance information corresponding to each pairing of a first electrode 7 and a third electrode 27 according to a sequence which may be predetermined or dynamically determined in the same way as for the first and second touch controllers 44, 56.

In the example shown in FIG. 17, the fifth touch panel system 96 allows measurements of two-dimensional mutual capacitance information in the first and second directions x, y, and one-dimensional pressure information in the first direction x. In alternative examples, a second pressure measurement channel including signal separation stages 82, an amplification module 83 and a multiplexer 98 may be provided for the third electrodes 27 to add another dimension of pressure sensing. In this latter case, the capacitive touch controller 84 may drive the third electrodes 27 through the signal separation stages 82 of the second pressure measurement channel.

In the example shown in FIG. 17, the capacitive, touch controller 84 performs mutual capacitance measurements. Alternatively, the capacitive touch controller 84 may perform self-capacitance measurements of the first and third electrodes 7, 27 individually.

The capacitive touch controller 84 does not need to be a separate module within the third touch controller 97, and alternatively may be integrated with the controller 99. In other examples, the capacitive touch controller 84 may be provided separately from the third touch controller 97, which may facilitate augmenting an existing projected capacitance touch system with pressure sensing on one or both of x- and y-electrodes.

Using the ADC 89 synchronised to sample during low or zero signal periods of the capacitance measurement signal may provide some or all of the same effects as in the first and second touch systems 42, 56. Similarly, multiplexing of the amplified signals 88 may provide some or all of the same effects as in the first and second touch systems 42, 56.

The third, touch controller 97 may alternatively be used with the second, third or fourth touch panels 59, 64, 72 instead of the first touch panel 43.

Figure 18:
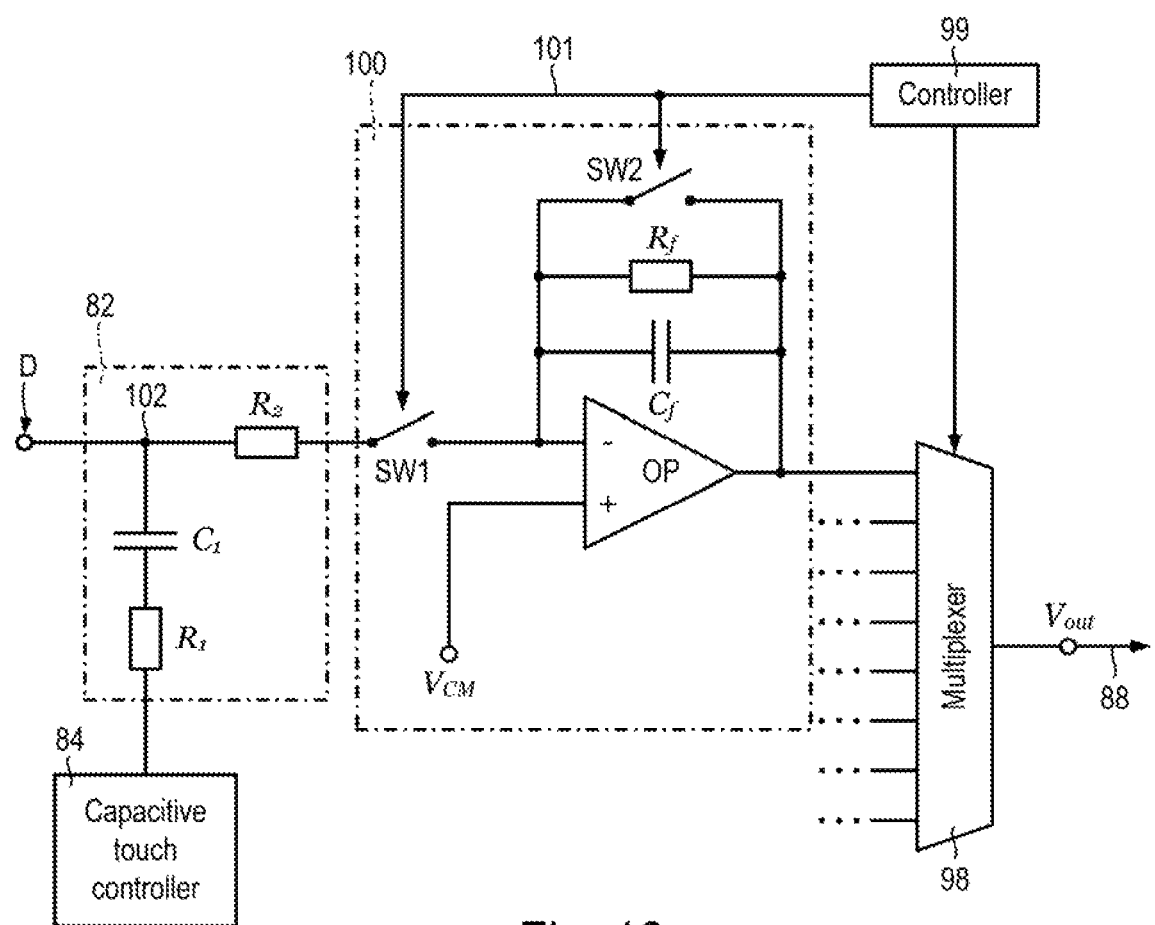
FIG. 18 is a circuit diagram for an example of a charge amplifier for use in the fifth touch panel system.

Example of charge amplifiers: Referring also to FIG. 18, an example of one configuration of the charge amplifiers 100 and signal separation stages 82 is shown for the third touch controller 97.

In one configuration, each charge amplifier 100 includes an operational amplifier OP having an inverting input, a non-inverting input and an output. Each charge, amplifier 100 forming part of the amplification module 83 includes an operational amplifier OP having an inverting input coupled to a corresponding terminal D via an input resistance $R_2$ and a first switch SW1 connected in series. The non-inverting input of the operational amplifier OP is connected to a common mode voltage $V_{CM}$. A feedback network of the charge amplifier 100 includes a feedback resistance $R_f$, a feedback capacitance $C_f$ and a second switch SW2 connected in parallel between the inverting input and the output of the operational amplifier OP. The output of the operational amplifier $V_{out}$ provides the amplified signal 88.

The capacitive touch controller 84 is connected to a node 102 between the input resistance $R_2$ and the terminal D via a resistance $R_1$ and capacitance $C_f$ connected in series. The resistances $R_1$, $R_2$, capacitance $C_1$ and node 102 together form the signal separation stage 82 in the example shown in FIG. 17. The high-pass filter 86 takes the form of the capacitance $C_f$. The feedback resistance and capacitance $R_f$, $C_f$, in combination with the input resistance $R_2$, control the frequency dependence of the amplifier 100, and are selected to attenuate the drive/received signals 91, 92.

Other terminals of the operational amplifier op, such as power supply terminals, may be present, but are not shown in this or other schematic circuit diagrams described herein.

The second switches SW2 permit the corresponding feedback capacitors $C_f$ to be discharged. The opening and closing of the second switches SW2 may be governed by the second synchronisation signal 101 provided by the controller 99. In this way, the feedback capacitors $C_f$ of each charge amplifier 100 may be periodically discharged in order to reset the feedback network of the operational amplifier OP to prevent excessive drift. Similarly, the first switches SW1 may be controlled by the second synchronisation signal 101 provided by the controller 99 to enable connection or disconnection from the corresponding first electrode 7 as required.

Figure 19:
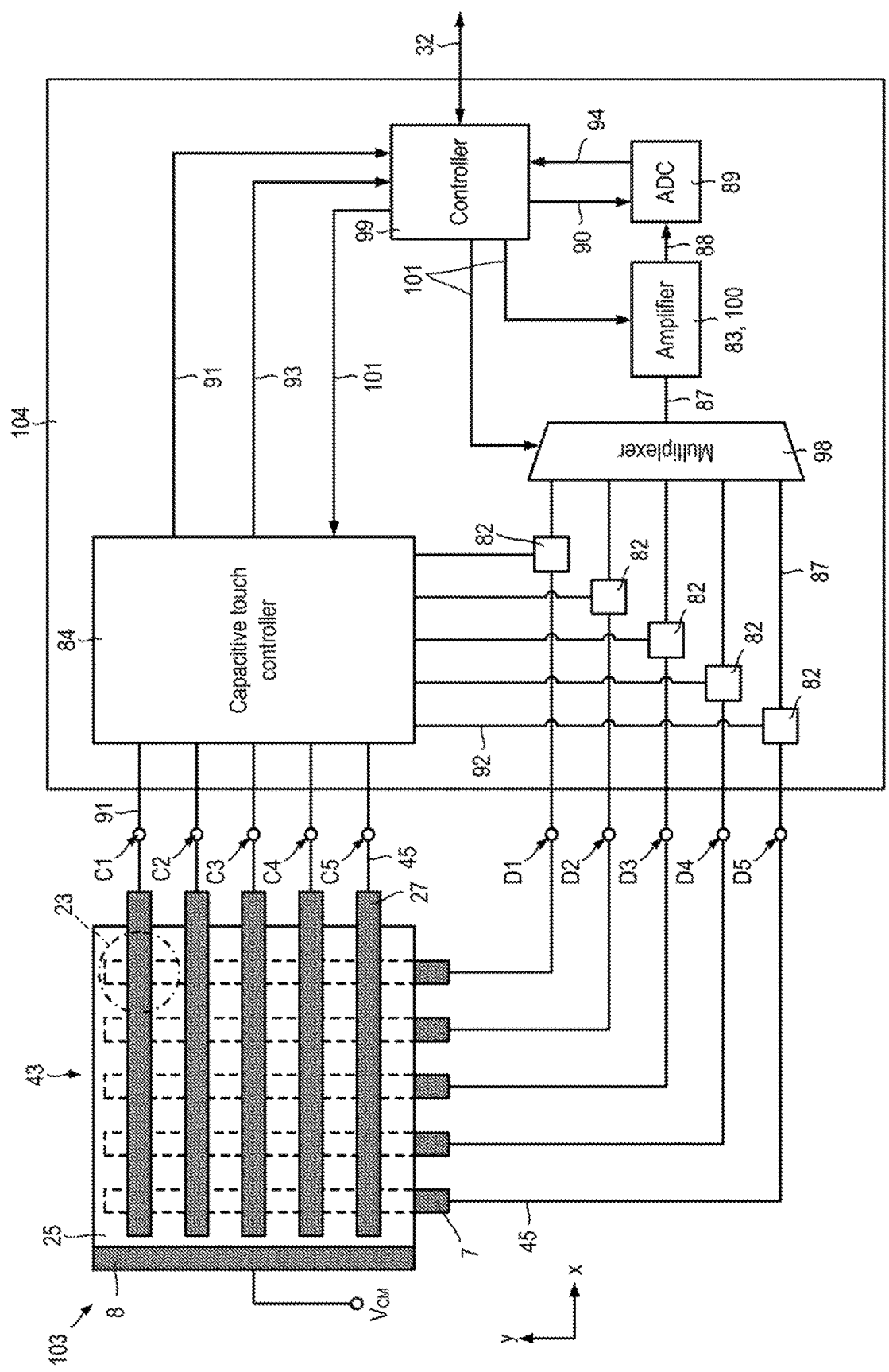
FIG. 19 illustrates a sixth touch panel system.

Sixth touch panel system: Referring also to FIG. 19, a sixth touch panel system 103 includes the first touch panel 43 and a fourth touch controller 104 for combined pressure and capacitance sensing.

The fourth touch controller 104 is the same as the third touch controller 97, except that the order of amplification and multiplexing is reversed, in the fourth touch controller 104, each input of the multiplexer 98 received input signals 87 via a respective signal separation stage 82, and the multiplexer 98 output is provided to an amplification module 83 in the form of a single charge amplifier 101. The processing of the amplified signals 88 is the same as for the third touch controller 97.

Figure 20:
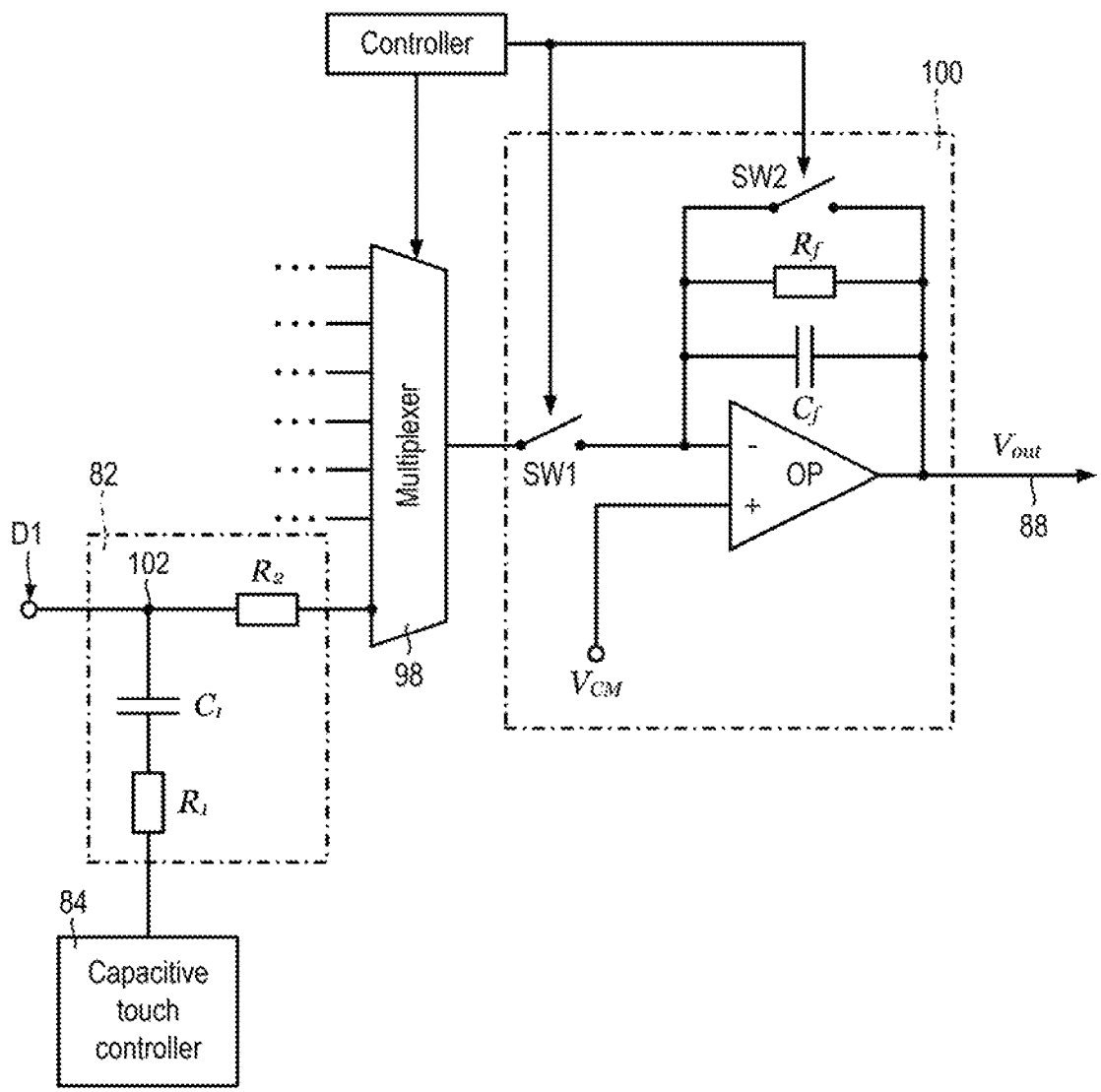
FIG. 20 is a circuit diagram for an example of a charge amplifier for use in the sixth touch panel system.

Referring also to FIG. 20, an example of one configuration of the charge amplifiers 100 and signal separation stages 82 is shown for the fourth touch controller 104.

The charge amplifier 100 is configured the same as for each of the charge amplifiers 100 of the third touch controller 97 (FIG. 18), except that the inverting input of the operational amplifier OP is connected to a signal separation stages 82 via the multiplexer 98.

Touch display stack-ups: The first, second, third and fourth touch controllers 44, 57, 97, 104 may be used in combination with a variety of different touch display stack-ups. The following examples are intended for illustrative purposes and are not exhaustive.

Figure 21:
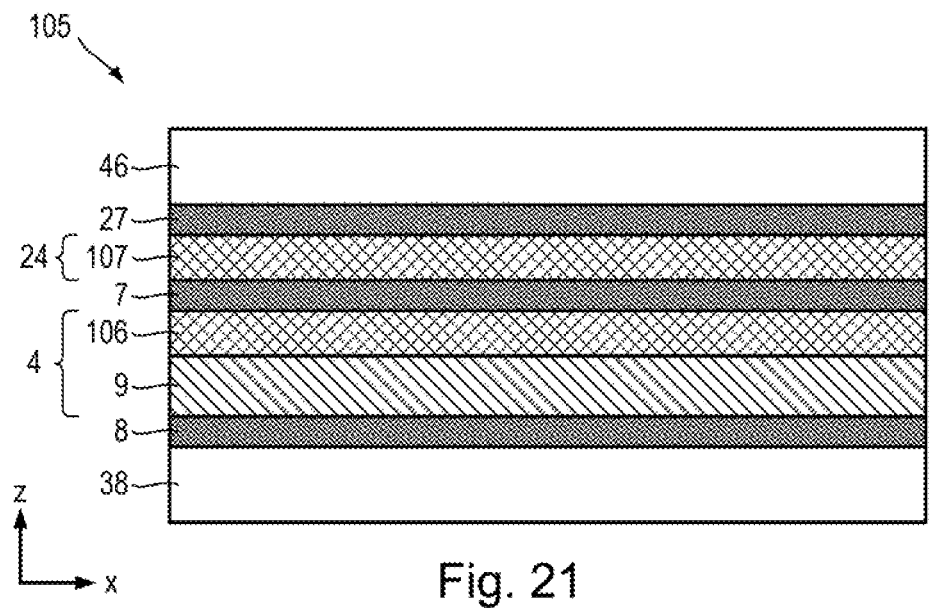
FIG. 21 is a cross sectional view of a first display stack-up.
Figure 22:
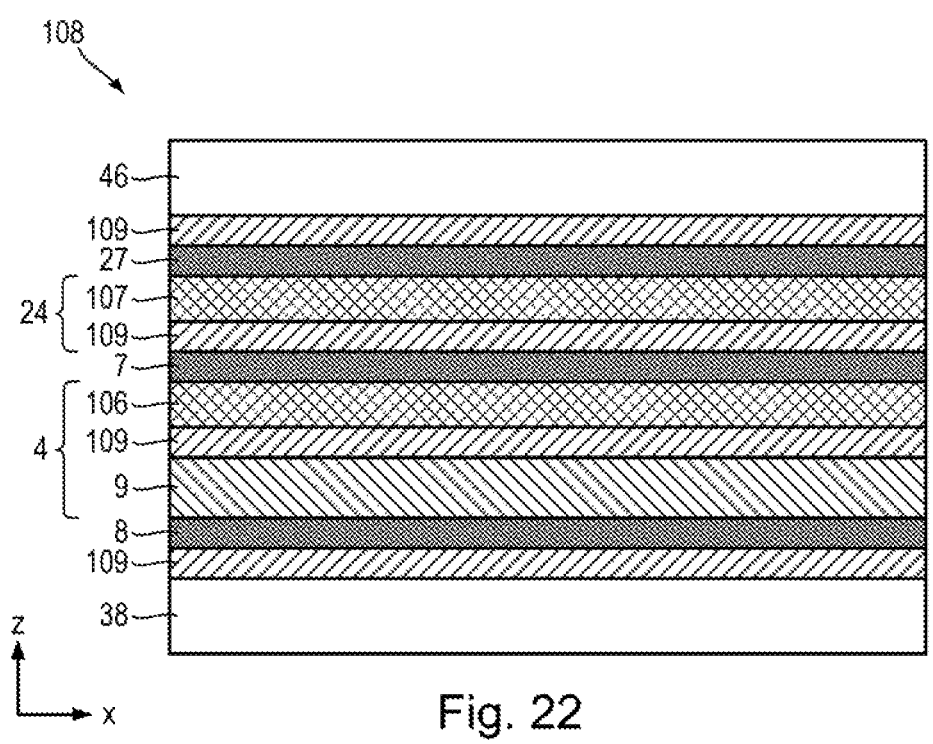
FIG. 22 is a cross-sectional view of a second display stack-up.

Referring also to FIG. 21, a first display stack-up 105 is shown.

The first display stack-up 105 includes a display 38, the second electrode 8, the layer of piezoelectric material 9, a first dielectric layer 106, the first electrodes 7, a second dielectric layer 107, the third electrodes 27 and a cover lens 46, stacked in the thickness direction z from the display 38 to the cover lens 46. The first layer structure 4 includes the layer of piezoelectric material 9 and the first dielectric layer 106. The second layer structure 24 corresponds to the second dielectric layer 107.

The first electrodes 7 take the form of a set of conductive regions extending in the second direction y and spaced apart in the first direction and are disposed on the first dielectric layer 106. The third electrodes 27 take the form of a set of conductive regions extending in the first direction x and spaced apart in the second direction y, and are disposed on the second dielectric layer 107. The second electrode 8 takes the form of a conductive material region disposed on the layer of piezoelectric material 9 such that the second electrode 8 at least partially overlaps each first electrode 7 and each third electrode 27.

The cover lens 46 is made of glass, or PET or any other substantially transparent material. The cover lens 46 may be up to about 20 mm thick and may be at least 0.05 mm thick. Preferably, the cover lens 46 is up to about 2 mm thick and may be at least 0.05 mm thick. The layer of piezoelectric material 9 is made of PVDF or any other substantially transparent piezoelectric material. An alternative material is polylactic acid. The layer of piezoelectric material may be up to about 110 µm thick, and may be at least 0.5 µm or at least 1 µm thick. The dielectric layers 106, 107 may be PET or any other substantially transparent polymer. The dielectric layers 106, 107 may be between 10 µm and 100 µm thick, for example, around 20 to 25 µm thick. Preferably the dielectric layers 106, 107 are in the range of about 10-100 µm thick. The conductive regions providing the electrodes 7, 8, 27 may be ITO, IZO or any other substantially transparent conductive material. The conductive regions providing the electrodes 7, 8, 27 may be applied to the dielectric layers 106, 107 and/or the layer of Piezoelectric material 9 using lithography, printing or other suitable methods. The shapes of the conductive regions providing the first, second and third electrodes 7, 8, 27 may be any suitable, electrode shape described in relation to the first or second touch panels 43, 59. The sheet resistance of conductive regions providing electrodes may be between 1 and 200 Ω/sq. The sheet resistance may be below 10 Ω/sq. Preferably, the sheet resistance is as low as is practical.

Referring also to FIG. 22, a second display stack-up 108 is shown.

The second display stack-up 108 is the same as the first display stack-up 105, except that elements of the second display stack-up 108 are bonded to One another using layers of pressure sensitive adhesive (PSA) material 109 extending in the first x and second y directions.

Figure 23:
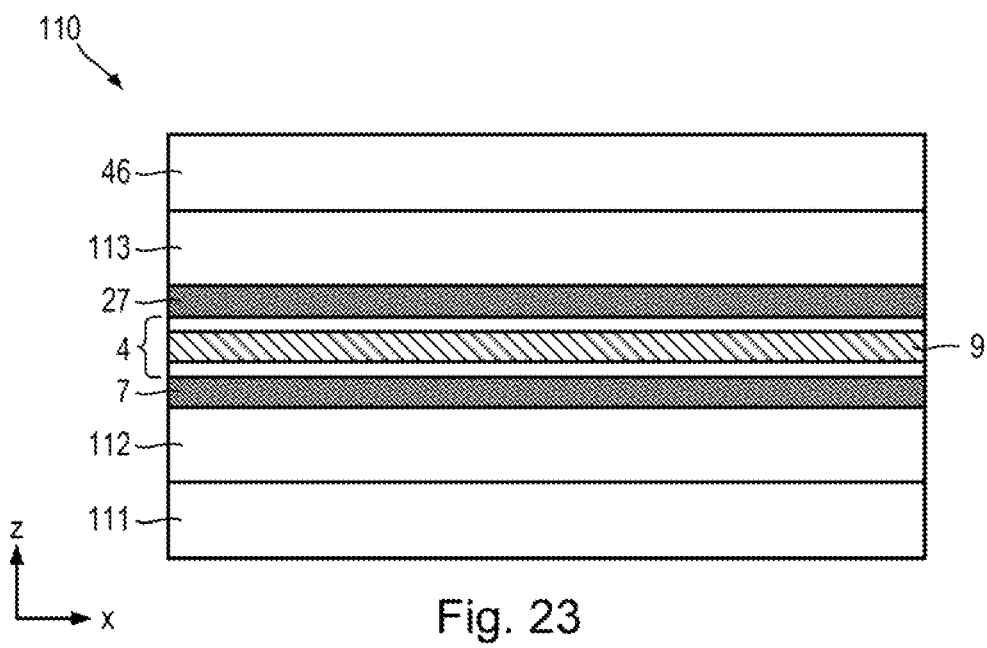
FIG. 23 is a cross sectional view of a first embedded stack-up.

Referring also to FIG. 23, a first embedded stack-up 110 is shown. The first embedded stack-up 110 includes a pixel array 111 of a display 38, a colour filter glass 112, first electrodes 7, a first layer structure 4, third electrodes 27, a polariser 113 and a cover lens 46 stacked in the thickness direction z from the pixel array 111 to the cover lens 46. The third electrodes 27 may be disposed on the first layer structure 4 and the first electrodes 7 may be disposed on the colour filter glass 112. Alternatively, the third electrodes 27 may be disposed on the first face 5 of the first layer structure 4 and the first electrodes 7 may be disposed on the second face 6 of the first layer structure 4. In some examples, the first layer structure 4 may include only the layer of piezoelectric material 9, in which case the first and third electrodes 7, 27 may be disposed on opposite faces of the layer of piezoelectric material 9.

By omitting the second electrode 8, 69, the display stack-up may be simplified and may also be thinner as fewer layers are required. Additionally, even a patterned second electrode 69 will partially shield the first and third electrodes 7, 27, and thus reduce the sensitivity of capacitive touch measurements, if located between a user and the first and third electrodes 7, 27. Such problems may be avoided using the first embedded stack-up 110.

Figure 24:
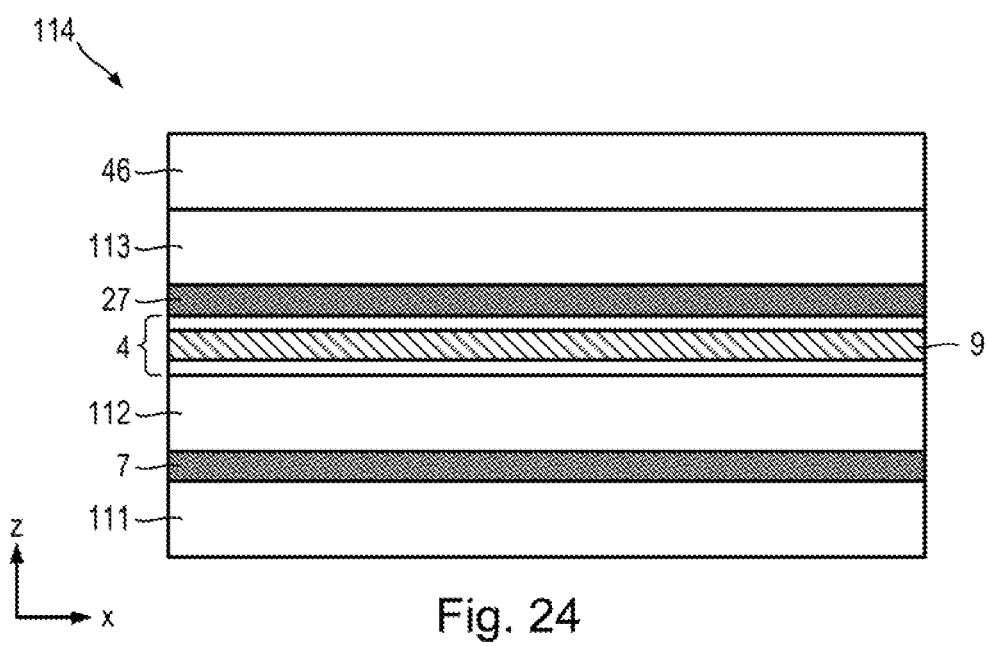
FIG. 24 is a cross-sectional view of a second embedded stack-up.

Referring also to FIG. 24, a second embedded stack-up 114 is shown. The second embedded stack-up 114 is the same as the first embedded stack-up 110, except that the order of the first electrodes 7 and the colour filter glass 112 is reversed, so that the second embedded stack-up 114 includes a pixel array 111 of a display 38, first electrodes 7, a colour filter glass 112, a first layer structure 4, third electrodes 27, a polariser 113 and a cover lens 46 stacked in the thickness direction z from the pixel array 111 to the cover lens 46.

Modifications: It will be appreciated that many modifications may be made to the embodiments hereinbefore described. Such modifications may involve equivalent and other features which are already known in the design, manufacture and use of pressure-sensing projected capacitance touch panels and which may be used instead of or in addition to features already described herein. Features of one embodiment may be replaced or supplemented by features of another embodiment.

Examples described hereinbefore have been illustrated in the accompanying drawings including specific numbers of electrodes for the purposed of illustration only. Examples according to the present specification are not limited in the number of first, second or third electrodes 7, 8 27 which may be connected to the hereinbefore described touch controllers.

With few exceptions, the first, second, third and fourth touch controllers 44, 57, 97, 104 may also be used with any of the display stack-ups or embedded stack ups described in connection with FIGS. 30A through to FIG. 45 of WO 2016/102975 A2.

Although the touch panels 43, 59, 64, 72 have been described baying electrodes 7 generally arranged in rows or columns, however, each electrode 7, 8, 27 may instead take the form of a conductive pad connected to a touch controller by an individual conductive trace.

In the described first, second, third and fourth touch controllers 44, 57, 97, 104, ADCs 50a, 50b, 89 are synchronised with one or more capacitance signals which contain information relating to self- or mutual-capacitances of first and/or third electrodes 7, 27. For example, the ADCs 50a, 50b, 89 may be synchronised with an alternating signal 17, $V_{sig}(t)$, a capacitance measurement voltage signal $V_{cap}(t)$, a capacitance drive signal 91, and/or a digitised amplified signal 54a, 54b.

Referring, as an example, to the first or second touch controllers 44, 57 in a case where mutual capacitance measurements are performed using the third electrodes 27 as transmitting, Tx, electrodes and the first electrodes 7 as receiving, Rx, electrodes. In such an example, the alternating signal 17, $V_{sig}(t)$ is supplied to the first amplifier module 48a, and the third electrodes 27 are driven with a capacitance measurement voltage signal $V_{cap}(t)$ in the form of a driving capacitance measurement signal $V_{drive}(t)$. It will be apparent that in some examples the alternating signal 17, $V_{sig}(t)$ may be substantially identical to the driving capacitance measurement signal $V_{drive}(t)$. The first electrodes 7 pick-up a capacitance measurement voltage signal $V_{cap}(t)$ in the form of a received capacitance measurement signal $V_{drive}(t)$, which depends on the driving capacitance measurement signal $V_{drive}(t)$ and a mutual capacitance between first and third electrodes 7, 27.

The primary ADCs 50a, 50b may be, synchronised to one or more of the alternating signal 17, $V_{sig}(t)$, the driving capacitance measurement signal $V_{drive}(t)$ or the received capacitance measurement signal $V_{receive}(t)$. A synchronisation signal 53 may include an offset with respect to the alternating signal 17, $V_{sig}(t)$, the driving capacitance measurement signal $V_{drive}(t)$ or the received capacitance measurement signal $V_{receive}(t)$, with the offset determined according to the expected phase shifts corresponding to the range of capacitances expected/measured for the corresponding touch panel 43, 59, 64, 72. It will be apparent that a synchronisation signal 53 determined in this way has the effect of triggering sampling of the amplified signals 14a, 14a at times when the amplitudes of the respective digitised amplified signals 54a, 54b are substantially equal to a ground, common mode or minimum value.

In a further example, the synchronisation signal 53 may be determined based on the driving capacitance measurement signal $V_{drive}(t)$, the received capacitance measurement signal $V_{relieve}(t)$, the amplified signals 14a, 14b (which prior to sampling by the primary ADCs 50a, 50b retain capacitance information) or the digitised amplified signals 54a, 54b. For example, trigger circuitry (not shown) may determine a condition such as a falling edge or a peak value of a monitored signal, and the synchronisation signal 53 may be generated to trigger the primary analog-to-digital converters 50a, 50b once a pre-set delay has elapsed since the condition of the trigger circuitry (not shown) was met. It will be apparent that a synchronisation signal 53 determined in this way has the effect of triggering sampling of the amplified signals 14a, 14a at times when the amplitudes of the respective digitised amplified signals 54a, 54b are substantially equal to a ground, common mode or minimum value, whether or not the trigger circuitry (not shown) monitors a digitised amplified signal 54a, 54b or another suitable capacitance signal.

The primary analog-to-digital converters 50a, 50b have been described as receiving the same synchronisation signal 53. However, this need not be the case, and instead the first primary analog-to-digital converter 50a may receive a first synchronisation signal (not shown) whilst the second primary analog-to-digital converter 50b receives a second synchronisation signal (not shown). The first and second synchronisation signals (not shown) may be based on, and have different offsets with respect to, a single capacitance signal, for example the alternating signal 17, $V_{sig}(t)$, the driving capacitance measurement signal or the received capacitance measurement signal $V_{receive}(t)$. Alternatively, the first and second synchronisation signals (not shown) may be based on different capacitance signals. For example, the first synchronisation signal (not shown) may be based on the driving capacitance measurement signal $V_{drive}(t)$, whilst the second synchronisation signal (not shown) may be based on the received capacitance measurement signal $V_{receive}(t)$. It will be apparent that first and second synchronisation signals (not shown) determined in this way have the effect of triggering sampling of the amplified signals 14a, 14a at times when the amplitudes of the respective digitised amplified signals 54a, 54b are substantially equal to a ground, common mode or minimum value.

In still further examples, the first and, second, synchronisation signals (not shown) may be determined based on the driving capacitance measurement signal $V_{drive}(t)$, the received capacitance measurement signal $V_{receive}(t)$, the amplified signals 14a, 14b, or the digitised amplified signals 54a, 54b. For example, using trigger circuitry (not shown) as explained hereinbefore. In one example, the first synchronisation signal (not shown) may be generated in response to a falling edge or a peak value of the driving capacitance measurement signal $V_{drive}(t)$ or the corresponding first amplified signal 14a, whilst the second synchronisation signal (not shown) is generated in response to a falling edge of peak value of the received capacitance measurement signal $V_{receive}(t)$ or the corresponding second amplified signal 14b. It will be apparent, that first and second synchronisation signals (not shown) determined in this way have the effect of triggering sampling of the amplified signals 14a, 14a at times when the amplitudes of the respective digitised amplified signals 54a, 54b are substantially equal to a ground, common mode or minimum value, whether or not the trigger circuitry (not shown) monitors a digitised amplified signal 54a, 54b or another suitable capacitance signal.

The hereinbefore described examples are equally applicable to the first, or second touch controllers 44, 57 in a case where mutual capacitance measurements are performed using the first electrodes 7 as driving, or transmitting, Tx, electrodes and the third electrodes 27 as receiving, Rx, electrodes. The hereinbefore described examples are applicable by analogy to the third and fourth touch controllers 97, 104. In particular, the synchronisation signal 90 which triggers the analog-to-digital converter 89 may be based oil any suitable capacitance signal, including the alternating signal 17, $V_{sig}(t)$, a capacitance measurement voltage signal $V_{cap}(t)$ such as a driving capacitance measurement signal 91, $V_{drive}(t)$ or a received capacitance measurement signal $V_{receive}(t)$.

Although claims have been formulated in this application to particular combinations of features, it should be understood that the scope of the disclosure of the present invention also includes any novel features or any novel combination of features disclosed herein either explicitly or implicitly or any generalization thereof, whether, or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. A device for processing signals from a projected capacitance touch panel, the touch panel comprising a layer of piezoelectric material disposed between a plurality of first electrodes and at least one second electrode, the device configured, in response to receiving input signals from a given first electrode, to generate a pressure signal indicative of a pressure applied to the touch panel proximate to the given first electrode and a capacitance signal indicative of a capacitance of the given first electrode, the device comprising:
    an amplifier configured to generate an amplified signal based on the input signals; and
        an analog-to-digital converter configured to be synchronised with the capacitance signal, and to generate the pressure signal by sampling the amplified signal at times corresponding to the amplitude of the capacitance signal being substantially equal to a selected value.

2. A device according to claim 1, wherein the selected value comprises a ground value.

3. A device according to claim 1, wherein the selected value comprises a common mode value.

4. A device according to claim 1, wherein the selected value comprises a minimum value.

5. A device according to claim 1, further configured to drive an electrode of the touch panel using a capacitance measurement signal, such that the input signals received from a given first electrode vary in dependence upon a capacitive coupling between the given first electrode and the capacitance measurement signal, and in dependence upon a strain of the layer of piezoelectric material proximate to the given first electrode.

6. A device according to claim 5, wherein the device is configured to generate a synchronisation signal in dependence upon the capacitance measurement signal, and wherein the analog-to-digital converter is configured to sample the amplified signal in dependence upon the synchronisation signal.

7. A device according to claim 6, wherein the device is configured to generate the synchronisation signal including an offset with respect to the capacitance measurement signal, the offset determined in dependence upon a phase difference between the capacitance measurement signal and the input signals received from the first electrode.

8. A device according to claim 1, wherein the device further comprises:
 a second analog-to-digital convertor configured to generate a digitised amplified signal by sampling the amplified signal; and
 a controller configured to generate the capacitance signal based on the digitised amplified signal.

9. A device according to claim 1, wherein the analog-to-digital converter is configured to generate the pressure signal and a digitised amplified signal sequentially, wherein
 the analog-to-digital converter is configured to generate the pressure signal by sampling the amplified signal at a first sampling frequency, $f_{piezo}$; and
 the analog-to-digital converter is configured to generate the capacitance signal by sampling the amplified signal at a second sampling frequency, $f_{cap}$, which is greater than the first sampling frequency;
 the device further comprising a controller configured to generate the capacitance signal based on the digitised amplified signal.

10. A device according to claim 1, further comprising:
 a capacitive touch controller; and
 a signal separation stage configured to couple the input signals to the amplifier and to couple the input signals to the capacitive touch controller via a high-pass filter.

11. A device according to claim 1, wherein the device includes a plurality of amplifiers, each amplifier configured for coupling to a first electrode of the touch panel, the device further comprising:
 a multiplexer having an input coupled to the output of each amplifier, and an output coupled to an input of the analog-to-digital converter.

12. A method of processing signals from a projected capacitance touch panel, the touch panel comprising a layer of piezoelectric material disposed between a plurality of first electrodes and at least one second electrode, the method comprising, in response to receiving input signals from a given first electrode:
 generating a capacitance signal indicative of a capacitance of the given first electrode;
 generating an amplified signal based on the input signals; and
 generating, using an analog-to-digital converter synchronised with the capacitance signal, a pressure signal indicative of a pressure applied to the touch panel proximate to the given first electrode, wherein the pressure signal is generated by sampling the amplified signal at times corresponding to the amplitude of the capacitance signal being substantially equal to a selected value.

13. A method according to claim 12, wherein the selected value comprises a ground value.

14. A method according to claim 12, wherein the selected value comprises a common mode value.

15. A method according to claim 12, wherein the selected value comprises a minimum value.

16. A method according to claim 12, further comprising driving an electrode of the touch panel using a capacitance measurement signal, such that the input signals received from a given first electrode vary in dependence upon a capacitive coupling between the given first electrode and the capacitance measurement signal, and in dependence upon a strain of the layer of piezoelectric material proximate to the given first electrode.

17. A method according to claim 16, further comprising:
 generating a synchronisation signal in dependence upon the capacitance measurement signal; and
 controlling the analog-to-digital converter to sample the amplified signal in dependence upon the synchronisation signal.

18. The method according to claim 17, wherein the synchronisation signal is generated including an offset with respect to the capacitance measurement signal, the offset determined in dependence upon a phase difference between the capacitance measurement signal and the input signals received from the first electrode.

19. A method according to claim 12, wherein generating the capacitance signal comprises:
 generating, using a second analog-to-digital convertor, a digitised amplified signal by sampling the amplified signal; and
 generating, using a controller, the capacitance signal based on the digitised amplified signal.

20. A method according to claim 12, further comprising sequentially generating the pressure signal and a digitised amplified signal, wherein:
 the pressure signal is generated by using the analog-to-digital converter to sample the amplified signal at a first sampling frequency, $f_{piezo}$; and
 the amplified signal is generating by using the analog-to-digital converter to sample the amplified signal at a second sampling frequency, $f_{cap}$, which is greater than the first sampling frequency;
 generating, using a controller, the capacitance signal based on the digitised amplified signal.

21. A device according to claim 1, wherein the analog-to-digital converter is configured to sample the amplified signal during every period of the capacitance signal.

22. A device according to claim 1, wherein the analog-to-digital converter configured not to sample the amplified signal during every period of the capacitance signal.

* * * * *